US009605858B2

(12) United States Patent
Warren et al.

(10) Patent No.: US 9,605,858 B2
(45) Date of Patent: Mar. 28, 2017

(54) THERMOSTAT CIRCUITRY FOR CONNECTION TO HVAC SYSTEMS

(75) Inventors: Daniel Adam Warren, San Francisco, CA (US); Hugo Fiennes, Palo Alto, CA (US); Jonathan Alan Dutra, Saratoga, CA (US); David Bell, Los Altos Hills, CA (US); Anthony Michael Fadell, Portola Valley, CA (US); Matthew Lee Rogers, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 1299 days.

(21) Appl. No.: 13/034,674

(22) Filed: Feb. 24, 2011

(65) Prior Publication Data

US 2012/0126021 A1 May 24, 2012

Related U.S. Application Data

(60) Provisional application No. 61/415,771, filed on Nov. 19, 2010, provisional application No. 61/429,093, filed on Dec. 31, 2010.

(51) Int. Cl.
F24F 11/053 (2006.01)
F24F 11/00 (2006.01)
(Continued)

(52) U.S. Cl.
CPC ...... F24F 11/0009 (2013.01); B01D 46/0086 (2013.01); F24D 19/10 (2013.01);
(Continued)

(58) Field of Classification Search
CPC .................. F24F 11/00; F24F 11/0012; F24F 2011/0068; F24F 11/0009;
(Continued)

(56) References Cited

U.S. PATENT DOCUMENTS 1,639,299 A 8/1927 Kinnard
2,101,637 A 12/1937 Howlett
(Continued)

FOREIGN PATENT DOCUMENTS

CA 2202008 2/2000
CN 101305248 A 11/2008
(Continued)

OTHER PUBLICATIONS

International Patent Application No. PCT/US2011/061339, International Preliminary Report on Patentability, issued May 30, 2013, 8 pages.

(Continued)

*Primary Examiner* — Frantz Jules
*Assistant Examiner* — Webeshet Mengesha
(74) *Attorney, Agent, or Firm* — Kilpatrick Townsend & Stockton LLP

(57) ABSTRACT

A thermostat and related methods is provided for controlling an HVAC system having one or two separate transformers for supplying power to the HVAC system. The thermostat includes isolation circuitry housed within the thermostat to safely connect to the HVAC control wires and power wire(s) whether the HVAC system has one or two separate transformers without the use of removable jumpers or manual rewiring. The thermostat can include a processor that sends DC signals for turning on and turning off each of the HVAC functions, and an isolator adapted to electrically isolate the processor from the control wires and power wire(s). The isolator can include a transformer, such as a low cost Ethernet transformer. The circuitry can include one or more field effect transistors adapted and arranged so as to open or close an electrical connections between the control and power wires, thereby turning on or off the associated HVAC (Continued)

function. According to some embodiments, the Rc and Rh terminals are permanently connected using a fuse.

18 Claims, 10 Drawing Sheets

(51) Int. Cl.
| | |
|---|---|
| G05D 23/19 | (2006.01) |
| F24D 19/10 | (2006.01) |
| H04W 4/00 | (2009.01) |
| B01D 46/00 | (2006.01) |
| G05B 15/02 | (2006.01) |
| F24F 11/02 | (2006.01) |

(52) U.S. Cl.
CPC ........ *F24D 19/1084* (2013.01); *F24F 11/001* (2013.01); *F24F 11/006* (2013.01); *F24F 11/0012* (2013.01); *F24F 11/0034* (2013.01); *F24F 11/0086* (2013.01); *F24F 11/02* (2013.01); *G05B 15/02* (2013.01); *G05D 23/19* (2013.01); *G05D 23/1902* (2013.01); *G05D 23/1917* (2013.01); *H04W 4/005* (2013.01); *F24F 2011/0047* (2013.01); *F24F 2011/0052* (2013.01); *F24F 2011/0053* (2013.01); *F24F 2011/0057* (2013.01); *F24F 2011/0061* (2013.01); *F24F 2011/0063* (2013.01); *F24F 2011/0068* (2013.01); *F24F 2011/0073* (2013.01); *F24F 2011/0075* (2013.01); *F24F 2011/0091* (2013.01); *F24F 2011/0093* (2013.01); *F24F 2011/0094* (2013.01); *Y02B 10/20* (2013.01); *Y02B 10/70* (2013.01); *Y02B 60/50* (2013.01); *Y10T 29/49826* (2015.01)

(58) Field of Classification Search
CPC .......... F24F 2011/0073; F24D 19/1084; F24D 19/10; G05D 23/1917; G05D 23/1902; G05D 23/19; H04W 4/005; Y10T 29/49826
USPC ........................................................ 236/1 C
See application file for complete search history.

(56) References Cited

U.S. PATENT DOCUMENTS

| | | | |
|---|---|---|---|
| 2,492,774 A | 12/1949 | Wild | |
| 3,025,484 A | 3/1962 | Cunningham | |
| 3,640,455 A | 2/1972 | Romanelli | |
| 3,948,441 A | 4/1976 | Perkins et al. | |
| 3,991,357 A | 11/1976 | Kaminski | |
| 4,049,973 A | 9/1977 | Lambert | |
| 4,157,506 A | 6/1979 | Spencer | |
| 4,177,923 A | 12/1979 | Krump | |
| 4,183,290 A | 1/1980 | Kucharczyk | |
| 4,223,831 A | 9/1980 | Szarka | |
| 4,249,696 A | 2/1981 | Donnelly et al. | |
| 4,308,991 A * | 1/1982 | Peinetti | F23N 5/203 |
| | | | 165/266 |
| 4,335,847 A | 6/1982 | Levine | |
| 4,408,711 A | 10/1983 | Levine | |
| 4,460,125 A | 7/1984 | Barker et al. | |
| 4,506,827 A | 3/1985 | Jamieson et al. | |
| 4,528,459 A | 7/1985 | Wiegel | |
| 4,615,380 A | 10/1986 | Beckey | |
| 4,632,303 A | 12/1986 | Rodittis | |
| 4,646,964 A | 3/1987 | Parker et al. | |
| 4,656,835 A | 4/1987 | Kidder et al. | |
| 4,657,179 A | 4/1987 | Aggers et al. | |
| 4,674,027 A | 6/1987 | Beckey | |
| 4,685,614 A | 8/1987 | Levine | |
| 4,695,246 A | 9/1987 | Beilfuss et al. | |
| 4,741,476 A | 5/1988 | Russo et al. | |
| 4,742,475 A | 5/1988 | Kaiser et al. | |
| 4,751,961 A | 6/1988 | Levine et al. | |
| 4,772,876 A | 9/1988 | Laud | |
| 4,798,971 A | 1/1989 | Gravely | |
| 4,842,510 A | 6/1989 | Grunden et al. | |
| 4,872,828 A | 10/1989 | Mierzwinski et al. | |
| 4,881,686 A | 11/1989 | Mehta | |
| 4,897,798 A | 1/1990 | Cler | |
| 4,898,229 A * | 2/1990 | Brown | G05D 23/19 |
| | | | 165/11.1 |
| 4,948,040 A | 8/1990 | Kobayashi et al. | |
| 4,948,044 A | 8/1990 | Cacciatore | |
| 4,955,806 A | 9/1990 | Grunden et al. | |
| 4,971,136 A | 11/1990 | Mathur et al. | |
| 5,065,813 A | 11/1991 | Berkeley et al. | |
| 5,088,645 A | 2/1992 | Bell | |
| 5,107,918 A | 4/1992 | McFarlane et al. | |
| 5,127,464 A | 7/1992 | Butler et al. | |
| 5,158,477 A | 10/1992 | Testa et al. | |
| 5,161,606 A | 11/1992 | Berkeley et al. | |
| 5,175,439 A | 12/1992 | Haerer et al. | |
| 5,181,389 A | 1/1993 | Hanson et al. | |
| 5,211,332 A | 5/1993 | Adams | |
| 5,224,648 A | 7/1993 | Simon et al. | |
| 5,226,591 A | 7/1993 | Ratz | |
| 5,240,178 A | 8/1993 | Dewolf et al. | |
| 5,244,146 A | 9/1993 | Jefferson et al. | |
| 5,251,813 A | 10/1993 | Kniepkamp | |
| 5,255,179 A | 10/1993 | Zekan et al. | |
| 5,260,669 A | 11/1993 | Higgins et al. | |
| 5,277,363 A | 1/1994 | Hart | |
| 5,318,224 A | 6/1994 | Darby et al. | |
| 5,347,982 A | 9/1994 | Binzer et al. | |
| 5,348,078 A | 9/1994 | Dushane et al. | |
| 5,352,930 A | 10/1994 | Ratz | |
| 5,381,950 A | 1/1995 | Aldridge | |
| 5,395,042 A | 3/1995 | Riley et al. | |
| 5,422,808 A | 6/1995 | Catanese, Jr. et al. | |
| 5,452,762 A | 9/1995 | Zillner, Jr. | |
| 5,456,407 A | 10/1995 | Stalsberg et al. | |
| 5,460,327 A | 10/1995 | Hill et al. | |
| 5,462,225 A | 10/1995 | Massara et al. | |
| 5,467,921 A | 11/1995 | Shreeve et al. | |
| 5,476,221 A | 12/1995 | Seymour | |
| 5,485,953 A | 1/1996 | Bassett et al. | |
| 5,499,196 A | 3/1996 | Pacheco | |
| 5,506,569 A | 4/1996 | Rowlette | |
| 5,533,668 A | 7/1996 | Erikson | |
| 5,544,036 A | 8/1996 | Brown, Jr. et al. | |
| 5,555,927 A | 9/1996 | Shah | |
| 5,570,837 A | 11/1996 | Brown et al. | |
| 5,595,342 A | 1/1997 | McNair et al. | |
| 5,611,484 A | 3/1997 | Uhrich | |
| 5,635,896 A | 6/1997 | Tinsley et al. | |
| 5,644,173 A | 7/1997 | Elliason et al. | |
| 5,646,349 A | 7/1997 | Twigg et al. | |
| 5,655,709 A | 8/1997 | Garnett et al. | |
| 5,673,850 A | 10/1997 | Uptegraph | |
| 5,697,552 A | 12/1997 | McHugh et al. | |
| 5,736,795 A | 4/1998 | Zuehlke et al. | |
| 5,761,083 A | 6/1998 | Brown, Jr. et al. | |
| 5,802,467 A | 9/1998 | Salazar et al. | |
| 5,808,294 A | 9/1998 | Neumann | |
| 5,839,654 A | 11/1998 | Weber | |
| 5,902,183 A | 5/1999 | D'Souza | |
| 5,903,139 A | 5/1999 | Kompelien | |
| 5,909,378 A | 6/1999 | De Milleville | |
| 5,918,474 A | 7/1999 | Khanpara et al. | |
| 5,926,776 A | 7/1999 | Glorioso et al. | |
| 5,931,378 A | 8/1999 | Schramm | |
| 5,950,709 A | 9/1999 | Krueger et al. | |
| 5,957,374 A | 9/1999 | Bias et al. | |
| 5,977,964 A | 11/1999 | Williams et al. | |
| 6,032,867 A | 3/2000 | Dushane et al. | |
| 6,060,719 A | 5/2000 | DiTucci et al. | |
| 6,062,482 A | 5/2000 | Gauthier et al. | |
| 6,066,843 A | 5/2000 | Scheremeta | |

(56) References Cited

U.S. PATENT DOCUMENTS

| | | |
|---|---|---|
| 6,072,784 A | 6/2000 | Agrawal et al. |
| 6,084,518 A | 7/2000 | Jamieson |
| 6,088,688 A | 7/2000 | Crooks et al. |
| 6,089,310 A | 7/2000 | Toth et al. |
| 6,095,427 A | 8/2000 | Hoium et al. |
| 6,098,893 A | 8/2000 | Berglund et al. |
| 6,102,749 A | 8/2000 | Lynn et al. |
| D435,473 S | 12/2000 | Eckel et al. |
| 6,196,468 B1 | 3/2001 | Young |
| 6,207,899 B1 | 3/2001 | Gillespie |
| 6,213,404 B1 | 4/2001 | Dushane et al. |
| 6,216,956 B1 | 4/2001 | Ehlers et al. |
| 6,222,719 B1 | 4/2001 | Kadah |
| 6,275,160 B1 | 8/2001 | Ha |
| 6,295,823 B1 | 10/2001 | Odom et al. |
| 6,315,211 B1 | 11/2001 | Sartain et al. |
| 6,336,593 B1 | 1/2002 | Bhatnagar |
| 6,347,747 B1 | 2/2002 | Nesbitt |
| 6,349,883 B1 | 2/2002 | Simmons et al. |
| 6,356,038 B2 | 3/2002 | Bishel |
| 6,356,204 B1 | 3/2002 | Guindi et al. |
| 6,370,894 B1 | 4/2002 | Thompson et al. |
| 6,385,510 B1 | 5/2002 | Hoog et al. |
| 6,415,205 B1 | 7/2002 | Myron et al. |
| 6,437,999 B1 | 8/2002 | Wittenbreder |
| 6,453,687 B2 | 9/2002 | Sharood et al. |
| 6,478,233 B1 | 11/2002 | Shah |
| 6,509,838 B1 | 1/2003 | Payne et al. |
| 6,513,723 B1 | 2/2003 | Mueller et al. |
| 6,519,509 B1 | 2/2003 | Nierlich et al. |
| 6,560,977 B1 | 5/2003 | Hupfel et al. |
| 6,566,768 B2 | 5/2003 | Zimmerman et al. |
| 6,574,581 B1 | 6/2003 | Bohrer et al. |
| 6,604,023 B1 | 8/2003 | Brown et al. |
| 6,622,115 B1 | 9/2003 | Brown et al. |
| 6,622,925 B2 | 9/2003 | Carner et al. |
| 6,623,311 B1 | 9/2003 | Dehan |
| 6,631,185 B1 | 10/2003 | Fleming, III |
| 6,645,066 B2 | 11/2003 | Gutta et al. |
| 6,657,418 B2 | 12/2003 | Atherton |
| 6,743,010 B2 | 6/2004 | Bridgeman et al. |
| 6,769,482 B2 | 8/2004 | Wagner et al. |
| 6,789,739 B2 | 9/2004 | Rosen |
| 6,794,771 B2 | 9/2004 | Orloff |
| 6,798,341 B1 | 9/2004 | Eckel et al. |
| 6,804,117 B2 | 10/2004 | Phillips et al. |
| 6,826,454 B2 | 11/2004 | Sulfstede |
| 6,851,621 B1 | 2/2005 | Wacker et al. |
| 6,851,967 B2 | 2/2005 | Miyoshi et al. |
| 6,886,754 B2 | 5/2005 | Smith et al. |
| 6,888,078 B2 | 5/2005 | Loeffelholz et al. |
| 6,888,441 B2 | 5/2005 | Carey |
| 6,891,838 B1 | 5/2005 | Petite et al. |
| 6,904,385 B1 | 6/2005 | Budike, Jr. |
| 6,909,921 B1 | 6/2005 | Bilger |
| 6,933,655 B2 | 8/2005 | Morrison et al. |
| 6,956,463 B2 | 10/2005 | Crenella et al. |
| 6,975,958 B2 | 12/2005 | Bohrer et al. |
| 6,983,889 B2 | 1/2006 | Alles |
| 6,990,821 B2 | 1/2006 | Singh et al. |
| 6,997,390 B2 | 2/2006 | Alles |
| 7,024,336 B2 | 4/2006 | Salsbury et al. |
| 7,055,759 B2 | 6/2006 | Wacker et al. |
| 7,083,109 B2 | 8/2006 | Pouchak |
| 7,130,719 B2 | 10/2006 | Ehlers et al. |
| 7,135,965 B2 | 11/2006 | Chapman, Jr. et al. |
| 7,149,727 B1 | 12/2006 | Nicholls et al. |
| 7,149,729 B2 | 12/2006 | Kaasten et al. |
| 7,156,316 B2 | 1/2007 | Kates |
| 7,156,318 B1 | 1/2007 | Rosen |
| 7,167,079 B2 | 1/2007 | Smyth et al. |
| 7,168,627 B2 | 1/2007 | Kates |
| 7,174,239 B2 | 2/2007 | Butler et al. |
| 7,181,317 B2 | 2/2007 | Amundson et al. |
| 7,188,482 B2 | 3/2007 | Sadegh et al. |
| 7,200,467 B2 | 4/2007 | Schanin et al. |
| 7,209,870 B2 | 4/2007 | Simmons et al. |
| 7,289,887 B2 | 10/2007 | Rodgers |
| 7,331,852 B2 | 2/2008 | Ezell et al. |
| 7,360,370 B2 | 4/2008 | Shah et al. |
| 7,379,791 B2 | 5/2008 | Tamarkin et al. |
| RE40,437 E | 7/2008 | Rosen |
| 7,434,742 B2 | 10/2008 | Mueller et al. |
| 7,460,690 B2 | 12/2008 | Cohen et al. |
| 7,469,550 B2 | 12/2008 | Chapman, Jr. et al. |
| 7,476,988 B2 | 1/2009 | Mulhouse et al. |
| 7,510,126 B2 | 3/2009 | Rossi et al. |
| 7,537,171 B2 | 5/2009 | Mueller et al. |
| 7,555,364 B2 | 6/2009 | Poth et al. |
| 7,558,648 B2 | 7/2009 | Hoglund et al. |
| 7,562,536 B2 | 7/2009 | Harrod et al. |
| 7,566,263 B2 | 7/2009 | Snyder |
| 7,571,865 B2 | 8/2009 | Nicodem et al. |
| 7,605,714 B2 | 10/2009 | Thompson et al. |
| 7,634,504 B2 | 12/2009 | Amundson |
| 7,644,869 B2 | 1/2010 | Hoglund et al. |
| 7,648,077 B2 | 1/2010 | Rossi et al. |
| 7,673,809 B2 | 3/2010 | Juntunen |
| 7,702,424 B2 | 4/2010 | Cannon et al. |
| 7,703,694 B2 | 4/2010 | Mueller et al. |
| D614,976 S | 5/2010 | Skafdrup et al. |
| 7,720,576 B2 | 5/2010 | Warren et al. |
| 7,735,118 B2 | 6/2010 | Brok et al. |
| 7,746,242 B2 | 6/2010 | Schwendinger et al. |
| 7,748,640 B2 | 7/2010 | Roher et al. |
| 7,755,220 B2 | 7/2010 | Sorg et al. |
| 7,775,452 B2 | 8/2010 | Shah et al. |
| 7,784,704 B2 | 8/2010 | Harter |
| 7,802,618 B2 | 9/2010 | Simon et al. |
| 7,809,472 B1 | 10/2010 | Silva et al. |
| 7,821,218 B2 | 10/2010 | Butler et al. |
| 7,832,465 B2 | 11/2010 | Zou et al. |
| 7,837,128 B2 | 11/2010 | Helt et al. |
| 7,841,542 B1 | 11/2010 | Rosen |
| 7,844,764 B2 | 11/2010 | Williams |
| 7,845,576 B2 | 12/2010 | Siddaramanna et al. |
| 7,847,681 B2 | 12/2010 | Singhal et al. |
| 7,848,900 B2 | 12/2010 | Steinberg et al. |
| 7,849,698 B2 | 12/2010 | Harrod et al. |
| 7,854,389 B2 | 12/2010 | Ahmed |
| 7,900,849 B2 | 3/2011 | Barton et al. |
| 7,904,209 B2 | 3/2011 | Podgorny et al. |
| 7,904,830 B2 | 3/2011 | Hoglund et al. |
| 7,933,689 B2 | 4/2011 | Warren et al. |
| 7,975,292 B2 | 7/2011 | Corella |
| 8,010,237 B2 | 8/2011 | Cheung et al. |
| 8,019,567 B2 | 9/2011 | Steinberg et al. |
| 8,037,022 B2 | 10/2011 | Rahman et al. |
| 8,067,912 B2 | 11/2011 | Mullin |
| D651,529 S | 1/2012 | Mongell et al. |
| 8,090,477 B1 | 1/2012 | Steinberg |
| 8,091,375 B2 | 1/2012 | Crawford |
| 8,131,497 B2 | 3/2012 | Steinberg et al. |
| D660,732 S | 5/2012 | Bould et al. |
| 8,174,381 B2 | 5/2012 | Imes et al. |
| 8,180,492 B2 | 5/2012 | Steinberg |
| 8,195,313 B1 | 6/2012 | Fadell et al. |
| 8,219,249 B2 | 7/2012 | Harrod et al. |
| 8,234,694 B2 | 7/2012 | Youn et al. |
| 8,249,731 B2 | 8/2012 | Tran et al. |
| 8,255,090 B2 | 8/2012 | Frader-Thompson et al. |
| 8,265,798 B2 | 9/2012 | Imes |
| 8,280,536 B1 | 10/2012 | Fadell et al. |
| 8,415,829 B2 | 4/2013 | Di Cristofaro |
| 8,442,695 B2 | 5/2013 | Imes et al. |
| 8,442,752 B2 | 5/2013 | Wijaya et al. |
| 8,510,255 B2 | 8/2013 | Fadell et al. |
| 8,544,285 B2 | 10/2013 | Stefanski et al. |
| 8,708,242 B2 | 4/2014 | Conner et al. |
| 8,727,611 B2 | 5/2014 | Huppi et al. |
| 8,740,101 B2 | 6/2014 | Leen et al. |
| 8,752,771 B2 | 6/2014 | Warren et al. |
| 8,757,507 B2 | 6/2014 | Fadell et al. |
| 8,788,103 B2 | 7/2014 | Warren et al. |

(56) References Cited

U.S. PATENT DOCUMENTS

| | | |
|---|---|---|
| 8,918,219 B2 | 12/2014 | Sloo et al. |
| 2002/0005707 A1 | 1/2002 | Kerai et al. |
| 2002/0074865 A1 | 6/2002 | Zimmerman et al. |
| 2002/0075145 A1 | 6/2002 | Hardman et al. |
| 2002/0198629 A1 | 12/2002 | Ellis |
| 2003/0037555 A1 | 2/2003 | Street et al. |
| 2003/0064335 A1 | 4/2003 | Canon |
| 2003/0069648 A1 | 4/2003 | Douglas et al. |
| 2003/0090243 A1 | 5/2003 | Atherton |
| 2003/0151513 A1 | 8/2003 | Herrmann et al. |
| 2003/0231001 A1 | 12/2003 | Bruning |
| 2004/0058637 A1 | 3/2004 | Laiti |
| 2004/0090329 A1 | 5/2004 | Hitt |
| 2004/0117311 A1 | 6/2004 | Agarwal et al. |
| 2004/0120084 A1 | 6/2004 | Readio et al. |
| 2004/0130454 A1 | 7/2004 | Barton |
| 2004/0164238 A1 | 8/2004 | Xu et al. |
| 2004/0193324 A1 | 9/2004 | Hoog et al. |
| 2004/0209209 A1 | 10/2004 | Chodacki et al. |
| 2004/0238651 A1 | 12/2004 | Juntunen et al. |
| 2004/0245349 A1 | 12/2004 | Smith |
| 2004/0245352 A1 | 12/2004 | Smith |
| 2004/0249479 A1 | 12/2004 | Shorrock |
| 2004/0256472 A1 | 12/2004 | DeLuca |
| 2005/0040250 A1 | 2/2005 | Wruck |
| 2005/0043907 A1 | 2/2005 | Eckel et al. |
| 2005/0053063 A1 | 3/2005 | Madhavan |
| 2005/0080493 A1 | 4/2005 | Arntson |
| 2005/0090915 A1 | 4/2005 | Geiwitz |
| 2005/0128067 A1 | 6/2005 | Zakrewski |
| 2005/0145705 A1 | 7/2005 | Shah et al. |
| 2005/0150968 A1 | 7/2005 | Shearer |
| 2005/0159846 A1 | 7/2005 | Van Ostrand et al. |
| 2005/0159847 A1 | 7/2005 | Shah et al. |
| 2005/0187867 A1 | 8/2005 | Sokolic et al. |
| 2005/0189429 A1 | 9/2005 | Breeden |
| 2005/0192915 A1 | 9/2005 | Ahmed et al. |
| 2005/0194455 A1 | 9/2005 | Alles |
| 2005/0194456 A1 | 9/2005 | Tessier et al. |
| 2005/0195757 A1 | 9/2005 | Kidder et al. |
| 2005/0270151 A1 | 12/2005 | Winick |
| 2005/0280421 A1 | 12/2005 | Yomoda et al. |
| 2006/0090066 A1 | 4/2006 | Maze et al. |
| 2006/0102731 A1 | 5/2006 | Mueller et al. |
| 2006/0102732 A1 | 5/2006 | Garrett et al. |
| 2006/0105697 A1 | 5/2006 | Aronstam et al. |
| 2006/0124759 A1 | 6/2006 | Rossi et al. |
| 2006/0147003 A1 | 7/2006 | Archacki et al. |
| 2006/0149395 A1 | 7/2006 | Archacki et al. |
| 2006/0164257 A1 | 7/2006 | Giubbini |
| 2006/0186214 A1 | 8/2006 | Simon et al. |
| 2006/0196953 A1 | 9/2006 | Simon et al. |
| 2006/0208099 A1 | 9/2006 | Chapman et al. |
| 2006/0219799 A1 | 10/2006 | Schultz et al. |
| 2007/0043478 A1 | 2/2007 | Ehlers et al. |
| 2007/0045431 A1 | 3/2007 | Chapman et al. |
| 2007/0045432 A1 | 3/2007 | Juntunen |
| 2007/0045433 A1 | 3/2007 | Chapman et al. |
| 2007/0045441 A1 | 3/2007 | Ashworth et al. |
| 2007/0095082 A1 | 5/2007 | Garrett et al. |
| 2007/0103824 A1 | 5/2007 | Patterson et al. |
| 2007/0105252 A1 | 5/2007 | Lee et al. |
| 2007/0114295 A1 | 5/2007 | Jenkins |
| 2007/0114848 A1 | 5/2007 | Mulhouse et al. |
| 2007/0115135 A1 | 5/2007 | Mulhouse et al. |
| 2007/0115902 A1 | 5/2007 | Shamoon et al. |
| 2007/0131787 A1 | 6/2007 | Rossi et al. |
| 2007/0132503 A1 | 6/2007 | Nordin |
| 2007/0157639 A1 | 7/2007 | Harrod |
| 2007/0158442 A1 | 7/2007 | Chapman et al. |
| 2007/0183475 A1 | 8/2007 | Hutcherson |
| 2007/0183478 A1 | 8/2007 | Becker et al. |
| 2007/0205297 A1 | 9/2007 | Finkam et al. |
| 2007/0208461 A1 | 9/2007 | Chase |
| 2007/0221741 A1 | 9/2007 | Wagner et al. |
| 2007/0227862 A1 | 10/2007 | Yim et al. |
| 2007/0228183 A1 | 10/2007 | Kennedy et al. |
| 2007/0241203 A1 | 10/2007 | Wagner et al. |
| 2007/0266575 A1 | 11/2007 | Nash |
| 2007/0272527 A1 | 11/2007 | Mattlar et al. |
| 2007/0296280 A1 | 12/2007 | Sorg et al. |
| 2008/0006709 A1 | 1/2008 | Ashworth et al. |
| 2008/0015740 A1 | 1/2008 | Osann |
| 2008/0015742 A1 | 1/2008 | Kulyk et al. |
| 2008/0048046 A1 | 2/2008 | Wagner et al. |
| 2008/0054082 A1 | 3/2008 | Evans et al. |
| 2008/0054084 A1 | 3/2008 | Olson |
| 2008/0094010 A1 | 4/2008 | Black |
| 2008/0099568 A1 | 5/2008 | Nicodem et al. |
| 2008/0128523 A1 | 6/2008 | Hoglund et al. |
| 2008/0133956 A1 | 6/2008 | Fadell |
| 2008/0142344 A1 | 6/2008 | Hickam |
| 2008/0147242 A1 | 6/2008 | Roher et al. |
| 2008/0151458 A1 | 6/2008 | Beland et al. |
| 2008/0161977 A1 | 7/2008 | Takach et al. |
| 2008/0179412 A1 | 7/2008 | Rhodes |
| 2008/0183335 A1 | 7/2008 | Poth et al. |
| 2008/0185450 A1 | 8/2008 | Kwon et al. |
| 2008/0191045 A1 | 8/2008 | Harter |
| 2008/0202135 A1 | 8/2008 | Francis |
| 2008/0221737 A1 | 9/2008 | Josephson et al. |
| 2008/0238660 A1 | 10/2008 | Dayton et al. |
| 2008/0273754 A1 | 11/2008 | Hick et al. |
| 2008/0317292 A1 | 12/2008 | Baker et al. |
| 2009/0012959 A1 | 1/2009 | Ylivainio et al. |
| 2009/0045263 A1 | 2/2009 | Mueller et al. |
| 2009/0057425 A1 | 3/2009 | Sullivan et al. |
| 2009/0057427 A1 | 3/2009 | Geadelmann et al. |
| 2009/0065595 A1 | 3/2009 | Kates |
| 2009/0070412 A1 | 3/2009 | D'Angelo et al. |
| 2009/0099697 A1 | 4/2009 | Li et al. |
| 2009/0127932 A1 | 5/2009 | Warren et al. |
| 2009/0140056 A1 | 6/2009 | Leen |
| 2009/0140057 A1 | 6/2009 | Leen |
| 2009/0140064 A1 | 6/2009 | Schultz et al. |
| 2009/0140065 A1 | 6/2009 | Juntunen et al. |
| 2009/0143879 A1 | 6/2009 | Amundson et al. |
| 2009/0143880 A1 | 6/2009 | Amundson et al. |
| 2009/0171862 A1 | 7/2009 | Harrod et al. |
| 2009/0192894 A1 | 7/2009 | Dikeman |
| 2009/0194601 A1 | 8/2009 | Flohr |
| 2009/0195349 A1 | 8/2009 | Frader-Thompson et al. |
| 2009/0236433 A1 | 9/2009 | Mueller et al. |
| 2009/0243842 A1 | 10/2009 | Mitchell et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0297901 A1 | 12/2009 | Kilian et al. |
| 2009/0312968 A1 | 12/2009 | Phillips et al. |
| 2009/0327354 A1 | 12/2009 | Resnick et al. |
| 2010/0000239 A1 | 1/2010 | Lifson et al. |
| 2010/0006660 A1 | 1/2010 | Leen et al. |
| 2010/0012737 A1 | 1/2010 | Kates |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0058450 A1 | 3/2010 | Fein et al. |
| 2010/0070084 A1 | 3/2010 | Steinberg et al. |
| 2010/0070086 A1 | 3/2010 | Harrod et al. |
| 2010/0070089 A1 | 3/2010 | Harrod et al. |
| 2010/0070099 A1 | 3/2010 | Watson et al. |
| 2010/0070234 A1 | 3/2010 | Steinberg et al. |
| 2010/0076605 A1 | 3/2010 | Harrod et al. |
| 2010/0084482 A1 | 4/2010 | Kennedy et al. |
| 2010/0084918 A1 | 4/2010 | Fells et al. |
| 2010/0106305 A1 | 4/2010 | Pavlak et al. |
| 2010/0106322 A1 | 4/2010 | Grohman |
| 2010/0114382 A1 | 5/2010 | Ha et al. |
| 2010/0131112 A1 | 5/2010 | Amundson et al. |
| 2010/0163633 A1 | 7/2010 | Barrett et al. |
| 2010/0163635 A1 | 7/2010 | Ye |
| 2010/0167783 A1 | 7/2010 | Alameh et al. |
| 2010/0168924 A1 | 7/2010 | Tessier et al. |
| 2010/0179704 A1 | 7/2010 | Ozog |

(56) References Cited

U.S. PATENT DOCUMENTS

| | | |
|---|---|---|
| 2010/0182743 A1 | 7/2010 | Roher |
| 2010/0191387 A1 | 7/2010 | Warren et al. |
| 2010/0193592 A1 | 8/2010 | Simon et al. |
| 2010/0198425 A1 | 8/2010 | Donovan |
| 2010/0199086 A1 | 8/2010 | Kuang et al. |
| 2010/0211224 A1 | 8/2010 | Keeling et al. |
| 2010/0250009 A1 | 9/2010 | Lifson et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0298985 A1 | 11/2010 | Hess et al. |
| 2010/0305771 A1 | 12/2010 | Rodgers |
| 2010/0308119 A1 | 12/2010 | Steinberg et al. |
| 2010/0318227 A1 | 12/2010 | Steinberg et al. |
| 2011/0001812 A1 | 1/2011 | Kang et al. |
| 2011/0015798 A1 | 1/2011 | Golden et al. |
| 2011/0015802 A1 | 1/2011 | Imes |
| 2011/0025257 A1 | 2/2011 | Weng |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0054699 A1 | 3/2011 | Imes et al. |
| 2011/0054710 A1 | 3/2011 | Imes et al. |
| 2011/0077758 A1 | 3/2011 | Tran et al. |
| 2011/0077896 A1 | 3/2011 | Steinberg et al. |
| 2011/0078675 A1 | 3/2011 | Van Camp et al. |
| 2011/0119747 A1 | 5/2011 | Lambiase |
| 2011/0137467 A1 | 6/2011 | Leen et al. |
| 2011/0151837 A1 | 6/2011 | Winbush, III |
| 2011/0152024 A1 | 6/2011 | Kuehl |
| 2011/0160913 A1 | 6/2011 | Parker et al. |
| 2011/0160918 A1 | 6/2011 | McMasters et al. |
| 2011/0166712 A1 | 7/2011 | Kramer et al. |
| 2011/0185895 A1 | 8/2011 | Freen |
| 2011/0241624 A1 | 10/2011 | Park et al. |
| 2011/0253796 A1 | 10/2011 | Posa et al. |
| 2011/0282937 A1 | 11/2011 | Deshpande et al. |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0024969 A1 | 2/2012 | Kates |
| 2012/0031984 A1 | 2/2012 | Feldmeier et al. |
| 2012/0065935 A1 | 3/2012 | Steinberg et al. |
| 2012/0066168 A1 | 3/2012 | Fadell et al. |
| 2012/0085831 A1 | 4/2012 | Kopp |
| 2012/0101637 A1 | 4/2012 | Imes et al. |
| 2012/0126019 A1 | 5/2012 | Warren et al. |
| 2012/0126020 A1 | 5/2012 | Filson et al. |
| 2012/0126021 A1 | 5/2012 | Warren et al. |
| 2012/0128025 A1 | 5/2012 | Huppi et al. |
| 2012/0130546 A1 | 5/2012 | Matas et al. |
| 2012/0130679 A1 | 5/2012 | Fadell et al. |
| 2012/0158350 A1 | 6/2012 | Steinberg et al. |
| 2012/0179300 A1 | 7/2012 | Warren et al. |
| 2012/0199660 A1 | 8/2012 | Warren et al. |
| 2012/0203379 A1 | 8/2012 | Sloo et al. |
| 2012/0221151 A1 | 8/2012 | Steinberg |
| 2012/0233478 A1 | 9/2012 | Mucignat et al. |
| 2012/0248210 A1 | 10/2012 | Warren et al. |
| 2012/0248211 A1 | 10/2012 | Warren et al. |
| 2012/0252430 A1 | 10/2012 | Imes et al. |
| 2012/0258776 A1 | 10/2012 | Lord et al. |
| 2012/0273580 A1 | 11/2012 | Warren et al. |
| 2013/0073506 A1 | 3/2013 | Camp et al. |
| 2013/0087629 A1 | 4/2013 | Stefanski et al. |
| 2013/0173064 A1 | 7/2013 | Fadell et al. |
| 2013/0228633 A1 | 9/2013 | Toth et al. |
| 2014/0084072 A1 | 3/2014 | Conner et al. |

FOREIGN PATENT DOCUMENTS

| | | |
|---|---|---|
| CN | 101522447 A | 9/2009 |
| CN | 101849311 A | 9/2010 |
| EP | 207295 A1 | 1/1987 |
| EP | 447458 A1 | 9/1991 |
| EP | 196069 | 12/1991 |
| EP | 510807 A2 | 10/1992 |
| EP | 660287 A1 | 6/1995 |
| EP | 690363 A2 | 1/1996 |
| EP | 1275037 | 2/2006 |
| EP | 2302326 A1 | 3/2011 |
| JP | 59106311 | 6/1984 |
| JP | 01252850 | 10/1989 |
| JP | 09298780 A | 11/1997 |
| JP | 10023565 | 1/1998 |
| SI | 20556 A | 10/2001 |
| TW | 274364 | 4/1996 |
| TW | 2294828 A | 5/1996 |
| TW | 316955 B | 10/1997 |
| TW | 362230 | 6/1999 |
| TW | 532469 U | 5/2003 |
| TW | 535320 B | 6/2003 |
| TW | 2007009529 | 3/2007 |
| TW | 201232994 A | 8/2012 |
| WO | 2005019740 A1 | 3/2005 |
| WO | 2007027554 A2 | 3/2007 |
| WO | 2008054938 A2 | 5/2008 |
| WO | 2012068437 A3 | 5/2012 |
| WO | 2013058820 A1 | 4/2013 |

OTHER PUBLICATIONS

International Patent Application No. PCT/US2011/061339, International Search Report & Written Opinion, issued Apr. 3, 2012, 13 pages.

Taiwanese Office Action dated May 5, 2014 for ROC (Taiwan) Patent Application No. 100142428 filed Nov. 18, 2011, 18 pages.

Taiwanese Office Action dated Sep. 30, 2014 for ROC (Taiwan) Patent Application No. 100142428 filed Nov. 18, 2011, 8 pages.

Aprilaire Electronic Thermostats Model 8355 User's Manual Research Products Corporation, Dec. 2000, 16 pages.

Arens et al., Demand Response Electrical Appliance Manager—User Interface Design, Development and Testing, Poster, Demand Response Enabling Technology Development, University of California Berkeley, 2005, 1 page.

Arens et al., Demand Response Enabled Thermostat—Control Strategies and Interface, Demand Response Enabling Technology Development Poster, University of California Berkeley, 2004, 1 page.

Arens et al., Demand Response Enabling Technology Development, Phase I Report: Jun. 2003-Nov. 2005, University of California Berkeley, Apr. 4, 2006, pp. 1-108.

Arens et al., New Thermostat Demand Response Enabling Technology, Poster, University of California Berkeley, Jun. 10, 2004.

Auslander et al., UC Berkeley DR Research Energy Management Group, Power Point Presentation, DR ETD Workshop, State of California Energy Commission, Jun. 11, 2007, pp. 1-35.

Braeburn 5300 Installer Guide, Braeburn Systems, LLC, Dec. 9, 2009, 10 pages.

Braeburn Model 5200, Braeburn Systems, LLC, Jul. 20, 2011, 11 pages.

Bryant, SYSTXBBUIDO1 Evolution Control Installation Instructions, 2004, all pages.

Chen et al., Demand Response-Enabled Residential Thermostat Controls, Abstract, ACEEE Summer Study on Energy Efficiency in Buildings, Mechanical Engineering Dept. and Architecture Dept., University of California Berkeley, 2008, pp. 1-24 through 1-36.

Detroitborg, Nest Learning Thermostat: Unboxing and Review, [online], retrieved from the Internet: <URL: http://www.youtube.com/watch?v=KrgcOL4oLzc> [retrieved on Aug. 22, 2013], Feb. 10, 2012, 4 pages.

Ecobee Smart Thermostat Installation Manual, Jun. 29, 2011, 20 pages.

Ecobee Smart Thermostat User Manual, May 11, 2010, 20 pages.

Ecobee Smart Si Thermostat Installation Manual, Ecobee, Apr. 3, 2012, 40 pages.

(56) References Cited

OTHER PUBLICATIONS

Ecobee Smart Si Thermostat User Manual, Ecobee, Apr. 3, 2012, 44 pages.
Energy Joule, Ambient Devices, retrieved from the Internet: <URL: http://web.archive.org/web/20110723210421/http://www.ambientdevices.com/products/energyjoule.html> [retrieved on Aug. 1, 2012], Jul. 23, 2011, 2 pages.
Green, Thermo Heat Tech Cool, Popular Mechanics Electronic Thermostat Guide, Oct. 1985, pp. 155-158.
Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and THX9421 Product Data, Honeywell International, Inc., Jan. 12, 2012, 126 pages.
Honeywell Prestige THX9321-9421 Operating Manual, Honeywell International, Inc., Jul. 6, 2011, 120 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
Hunter Internet Thermostat Installation Guide, Hunter Fan Co., Aug. 14, 2012, 8 pages.
ICY 3815TT-001 Timer-Thermostat Package Box, ICY BV Product Bar Code No. 8717953007902, 2009, 2 pages.
Installation and Start-Up Instructions Evolution Control SYSTXB-BUID01, Bryant Heating & Cooling Systems, 2004, 12 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, Lux Products Corporation, Jan. 6, 2009, 48 pages.
Meier et al., Thermostat Interface Usability: A Survey, Ernest Orlando Lawrence Berkeley National Laboratory, Environmental Energy Technologies Division, Berkeley California, Sep. 2010, pp. 1-73.
Peffer et al., A Tale of Two Houses: The Human Dimension of Demand Response Enabling Technology from a Case Study of Adaptive Wireless Thermostat, Abstract, ACEEE Summer Study on Energy Efficiency in Buildings, Architecture Dept. and Mechanical Engineering Dept., University of California Berkeley, 2008, pp. 7-242 through 7-253.
Peffer et al., Smart Comfort At Home: Design of a Residential Thermostat to Achieve Thermal Comfort, and Save Money and Peak Energy, University of California Berkeley, Mar. 2007, 1 page.
RobertShaw Product Manual 9620, Maple Chase Company, Jun. 12, 2001, 14 pages.
RobertShaw Product Manual 9825i2, Maple Chase Company, Jul. 17, 2006, 36 pages.
Salus, S-Series Digital Thermostat Instruction Manual-ST620 Model No. Instruction Manual, www.salus-tech.com, Version 005, Apr. 29, 2010, 24 pages.
Sanford, iPod (Click Wheel) (2004), www.apple-history.com, retrieved from: http://apple-history.com/ipod [retrieved on Apr. 9, 2012], Apr. 9, 2012, 2 pages.
Shadrach, Energy Scavenging for Wireless Sensor Nodes with a Focus on Vibration to Electricity Conversion, Dissertation [online], retrieved from the Internet: <URL: http://users.cecs.anu.edu.au/~Shad.Roundy/paper/ShadThesis.pdf>, Jun. 2003, 297 pages.
SYSTXCCUIZ01-V Infinity Control Installation Instructions, Carrier Corp, May 31, 2012, 20 pages.
TB-PAC, TB-PHP, Base Series Programmable Thermostats, Carrier Corp, May 14, 2012, 8 pages.
TP-PAC, TP-PHP, TP-NAC, TP-NHP Performance Series AC/HP Thermostat Installation Instructions, Carrier Corp, Sep. 2007, 56 pages.
The Clever Thermostat, ICY BV Web Page, http://www.icy.nl/en/consumer/products/clever-thermostat, ICY BV, 2012, 1 page.
The Clever Thermostat User Manual and Installation Guide, ICY BV ICY3815 Timer-Thermostat, 2009, pp. 1-36.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White, R., (Emerson) Model IF81-261 Installation and Operating Instructions, White Rodgers, Apr. 15, 2010, 8 pages.
White, R., (Emerson) Model IF98EZ-1621 Homeowner's User Guide, White Rodgers, Jan. 25, 2012, 28 pages.
Wright, et al., DR ETD—Summary of New Thermostat, TempNode, & New Meter (UC Berkeley Project), Power Point Presentation, Public Interest Energy Research, University of California Berkeley, 2005, pp. 1-49.
ISR/WO mailed on Apr. 11, 2012 for International Patent Application PCT/US2011/061391 filed Nov. 18, 2011, all pages.
International Preliminary Report on Patentability mailed on Feb. 25, 2014 for International Patent Application No. PCT/US2011/061391 filed Nov. 18, 2011, all pages.
ISR/WO mailed on Jul. 6, 2012 for International Patent Application No. PCT/US2012/030084 filed on Mar. 22, 2012, all pages.
International Preliminary Report on Patentability mailed on May 1, 2014 for International Patent Application No. PCT/US2012/030084 filed on Mar. 22, 2012, all pages.
ISR/WO mailed on Jan. 22, 2013 for International Patent Application No. PCT/US2012/061148 filed on Oct. 19, 2012, all pages.
International Preliminary Report on Patentability mailed on May 1, 2014 for International Patent Application No. PCT/US2012/061148 filed on Oct. 19, 2012, all pages.
Taiwanese Office Action issued on Mar. 18, 2014 for ROC (Taiwan) Patent Application No. 100142429 filed on Nov. 8, 2011, all pages.
U.S. Appl. No. 60/512,886, Volkswagen Rotary Knob for Motor Vehicle—English Translation of German Application filed Oct. 20, 2003, all pages.
U.S. Patent Office Action issued on Dec. 23, 2014 for U.S. Appl. No. 14/504,220, filed Oct. 1, 2014, all pages.
Bourke. *Server Load Balancing*, O'Reilly & Associates Inc., Aug. 2001, 182 pages.
White et al. *A Conceptual Model for Simulation Load Balancing*, Proceedings of the 1998 Spring Simulation Interoperability Workshop, 1998, pp. 1-7.
*Electric Heat Lock Out on Heat Pumps*, Washington State University Extension Energy Program, Apr. 2010, pp. 1-3.
*Introducing the New Smart Si Thermostat Datasheet* [online] Retrieved from the Internet: <URL: https:www.ecobee.com/solutions/home/smart-si> on Feb. 25, 2013, Ecobee, Mar. 12, 2012, 4 pages.
NetX RP32-WiFi Network Thermostat Consumer Brochure Network Thermostat, May 2011, 2 pages.
NetX RP32-WiFi Network Thermostat Specification Sheet Network Thermostat, Feb. 28, 2012, 2 pages.

(56) References Cited

OTHER PUBLICATIONS

T8611G Chronotherm IV Deluxe Programmable Heat Pump Thermostat Product Data, Honeywell International Inc., Oct. 1997, 24 pages.

The Perfect Climate Comfort Center PC8900A W8900A-C Product Data Sheet, Honeywell International Inc., Apr. 2001, 44 pages.

Deleeuw *Ecobee WiFi enabled Smart Thermostat Part 2: The Features Review*, Dec. 2, 2011. Retrieved from the Internet: <URL: http://www.homenetworkenabled.com/content.php?136-ecobee-WiFi-enabled-Smart-Thermostat-Part-2-The-Features-review> on Jan. 8, 2013, 5 pages.

Gao et al., *The Self-Programming Thermostat: Optimizing Setback Schedules Based on Home Occupancy Patterns* In Proceedings of the First ACM Workshop on Embedded Sensing Systems for Energy-Efficiency in Buildings, Nov. 3, 2009, 6 pages.

Loisos et al., *Buildings End-Use Energy Efficiency: Alternatives to Compressor Cooling*, California Energy Commission Public Interest Energy Research, Jan. 2000, 80 pages.

Lu et al., *The Smart Thermostat: Using Occupancy Sensors to Save Energy in Homes*, In Proceedings of the 8th ACM Conference on Embedded Networked Sensor Systems, Nov. 3-5, 2010, pp. 211-224.

Mozer, *The Neural Network House: An Environmental that Adapts to its Inhabitants*, Proceedings of the American Association for Artificial Intelligence, SS-98-02, 1998, pp. 110-114.

Allen, et al., *Real-Time Earthquake Detection and Hazard Assessment by ElarmS Across California*, Geophysical Research Letters, vol. 36, L00B08, 2009, pp. 1-6.

Chatzigiannakis et al., "Priority Based Adaptive Coordination of Wireless Sensors and Actors" Q2SWinet '06, Oct. 2, 2006, pp. 37-44.

Akhlaghinia et al., "Occupancy Monitoring in Intelligent Environment through Integrated Wireless Localizing Agents," IEEE, 2009, 7 pages.

Akhlaghinia et al., "Occupant Behaviour Prediction in Ambient Intelligence Computing Environment," Journal of Uncertain Systems, vol. 2, No. 2, 2008, pp. 85-100.

Ros et al., "Multi-Sensor Human Tracking with the Bayesian Occupancy Filter," IEEE, 2009, 8 pages.

Stigge Jr. B. J. (2001). *Informed Home Energy Behavior: Developing a tool for homeowners to monitor plan and learn about energy conservation* (Master's thesis). Massachusetts Institute of Technology Cambridge.

Wong et al., "Maximum Likelihood Estimation of ARMA Model with Error Processes for Replicated Observations," National University of Singapore, Department of Economics, Working Paper No. 0217, Feb. 2002, 19 pages.

\* cited by examiner

THERMOSTAT CIRCUITRY FOR CONNECTION TO HVAC SYSTEMS

CROSS-REFERENCE TO RELATED APPLICATIONS

This patent application claims the benefit of the following commonly assigned applications: U.S. Prov. Ser. No. 61/415,771 filed Nov. 19, 2010; U.S. Prov. Ser. No. 61/429,093 filed Dec. 31, 2010. The subject matter of this patent application also relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/984,602 filed Jan. 4, 2011; U.S. Ser. No. 12/987,257 filed Jan. 10, 2011; U.S. Ser. No. 13/034,678 entitled "Thermostat Battery Recharging," filed on even date herewith; and U.S. Ser. No. 13/034,666 entitled "Thermostat Wiring Connector," filed on even date herewith. Each of the above-referenced patent applications is incorporated by reference herein.

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention generally relates to control systems for heating, ventilation and air conditioning (HVAC) systems. More particularly, embodiments of this invention relate to thermostats having jumperless designs and/or isolation circuitry.

In many single-stage heating and cooling systems, the heating system includes a low-voltage operated gas valve which controls the flow of gas to the furnace; the cooling system includes a contactor having a low-voltage coil and high-voltage contacts which control energizing of the compressor; and the circulation system includes a fan relay having a low-voltage coil and high-voltage contacts which control energizing of the fan which circulates the conditioned air.

The electrical power for energizing such low-voltage operated devices is provided either by a single transformer or by two separate transformers. If the heating and cooling system is installed as a complete unit, generally a single transformer is provided. Such a single transformer has the required volt-ampere output to operate all the low-voltage operated devices. If the cooling system is added to an existing heating system, sometimes an additional transformer is used.

For example, in a system originally designed to provide heating only, a fan relay is generally not provided since the fan is generally controlled directly by a thermal switch on the furnace. Therefore, in systems for providing heating only, the only electrical load on the transformer is often the gas valve. When the cooling system is subsequently added, the electrical load on the transformer increases due to the addition of the fan relay and the contactor. If the existing transformer does not have the sufficient volt-ampere output to operate all the low-voltage operated devices, an additional transformer is often added. Additionally, even if the additional transformer may not be necessary, it may nevertheless be installed so as to simplify the electrical wiring involved in the installation of the add-on cooling system.

It is desirable that a thermostat for controlling a single-stage heating and cooling system be constructed so as to enable it to be readily usable with either the single-transformer or two-transformer power source. A common approach is to electrically isolate the secondary windings of the two transformers from each other using a removable wire jumper. For example, see U.S. Pat. No. 4,049,973. U.S. Pat. No. 4,898,229 discusses a thermostat with integral means for detecting out-of-phase connection of a two-transformer power source, wherein an LED is used to indicate the out-of-phase connection to an installer. The installer is instructed to reverse the polarity of one of the two transformers if the LED is energized. U.S. Pat. No. 5,127,464 discusses a thermostat providing electrical isolation between connected heating and cooling transformers. However, the design nevertheless relies on a removable jumper to be manually inserted in the case where there is only a single HVAC transformer.

Thermostats in residential and light commercial buildings are often used to control multiple conditioning functions, such as heating, cooling, ventilating, etc. Often, a thermostat is designed such that the user must manually actuate a mechanical switch to change functions. For example, many thermostats have a mechanical switch with which the user can select from heating, cooling or fan functions. Some thermostat designs make use of mechanical relays for switching between functions such as heating, cooling, etc. Furthermore, many thermostat designs make use of relays for controlling each HVAC function, such that the relay within the thermostat is actuated each time the heating turns on or off, and each time the cooling turns on or off. However, it has been found that some users find the audible sound from actuating relays within the thermostat to be undesirable. Mechanical relays have a number of other disadvantages over solid state switching including larger size, reliability over time, and slower speed of switching.

SUMMARY

According to some embodiments a thermostat is provided for controlling an HVAC system having one or two transformers for supplying power to the HVAC system. The HVAC system has at least one control wire for controlling one or more HVAC functions and one or two electrical power return wires each of which is electrically connected to one of the one or two transformers. The thermostat includes a plurality of wiring terminals for making electrical connections to the control wire and to the power return wires, and circuitry connected to the terminals. The terminals and circuitry are adapted and arranged such that at least one control wire and the one or two power return wires can be connected whether the HVAC system has one or two transformers without the use of removable jumpers or manual rewiring. According to some embodiments, the terminals are each adapted to accept an electrical power return wire and each include a switch that automatically disrupts an electrical connection between the other terminal when an electrical return wire is connected to the terminal.

According to some embodiments, the thermostat also includes one or more solid state switching components adapted and arranged to provide switching so as to turn on and off each of the HVAC functions, an isolator, and a processor adapted and configured to send DC signals for turning on and turning off each of the HVAC functions using the solid state switching components. The isolator is preferably adapted to electrically isolate the processor from the solid state switching components such that the solid state switching components do not reference ground. The isolator can include a transformer, such as a low cost Ethernet transformer, and/or a capacitor. The circuitry can include one or more field effect transistors. Circuitry connected to the solid state switching components can be adapted and arranged such that the switching is left in an open state in the event of a failure condition within the thermostat.

According to some embodiments, a thermostat is provided for controlling an HVAC system having one or two transformers for supplying power to the HVAC system, with the thermostat including two power return wiring terminals for making electrical connections to one or two power return wires, and a switching circuit for electrically connecting the two power return wiring terminals in cases where the HVAC system has only one power transformer and electrically disconnecting the two power return wiring terminals in cases where the HVAC system two power transformers. One or more detection circuits can be adapted and arranged to detect whether the HVAC system has one or two power transformers. The switching circuit can connect or disconnect the two power return wiring terminals based on the detection circuits and/or input from a user. According to some embodiments, the two power return wiring terminals can also be electrically connected using one or more mechanical switches.

According to some embodiments, a thermostat and associated method is provided for controlling an HVAC system having multiple HVAC functions including a first HVAC function and a second HVAC function. The thermostat includes circuitry housed within the thermostat adapted and configured to silently and automatically switch between controlling the first and second HVAC functions, and to silently control the first HVAC function and the second HVAC function.

According to some embodiments a thermostat is provided for controlling an HVAC system having one or more HVAC functions. The thermostat includes one or more solid state switching components adapted and arranged to provide switching on and off each of the one or more HVAC functions, and current sensing circuitry adapted and arranged to sense current passing through the one or more solid state switching components. The current sensing circuitry can measure a voltage differential across at least one of the solid state switching components, or measure a voltage differential across a thermistor in series with the solid state switching components. The current sensing can be used for detection of a fault condition such as a wire connection fault.

According to some embodiments, a thermostat is provided for controlling an HVAC system having multiple HVAC functions including a first HVAC function and a second HVAC function, the thermostat comprising circuitry housed within the thermostat adapted and configured to silently and automatically switch between controlling the first and second HVAC functions, and to silently control the first HVAC function and the second HVAC function.

As used herein the term "HVAC" includes systems providing both heating and cooling, heating only, cooling only, as well as systems that provide other occupant comfort and/or conditioning functionality such as humidification, dehumidification and ventilation.

As used herein the term "thermostat" includes any device, instrument and/or system for controlling at least some aspect of an HVAC system. While it is very common for a thermostat to control an HVAC system primarily based on temperature, the term includes controlling devices, for example, that control an HVAC system based on other parameters such as humidity.

As used herein the term "jumper" refers to a short length of conductor that is designed to be manually inserted or removed, such as by a user or installer, to close a break in or bypass part of an electrical circuit. The terms "jumperless" and "jumper-free" refer to a circuit or design that avoids the need for manual insertion and/or removal of a jumper during setup, installation, and/or configuration.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "silent" or "silently" when referring to thermostat operation and/or control means that any sound made by the thermostat is generally inaudible to the human ear at a range of greater than 1 meter.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
FIG. 1 is a diagram of an enclosure with an HVAC system, according to some embodiments.

FIG. 1 is a diagram of an enclosure with an HVAC system, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons.

Figure 2:
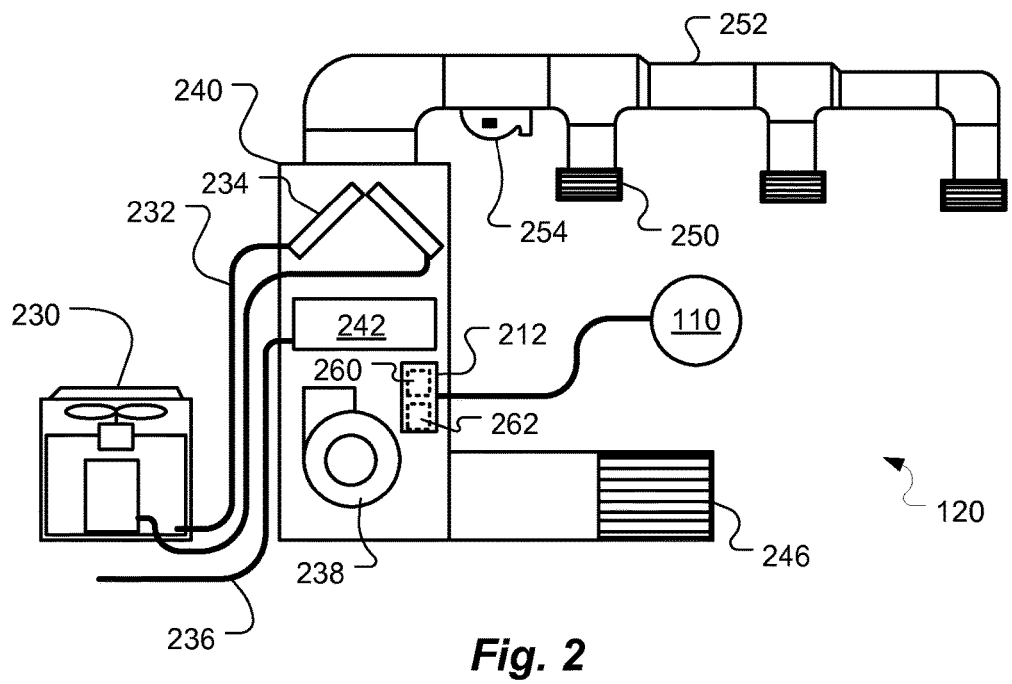
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used such as hydronic, in-floor radiant heating, heat pump, etc. In heating, heating coils or elements 242 within air handler 240 provide a source of heat using electricity or gas via line 236. Cool air is drawn from the enclosure via return air duct 246 through fan 238 and is heated by heating coils or elements 242. The heated air flows back into the enclosure at one or more locations via supply air duct system 252 and supply air grills such as grill 250. In cooling an outside compressor 230 passes gas such as Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems.

Thermostat 110 controls the HVAC system 120 through a number of control circuits. In particular, there is often separate control systems for heating and cooling. The heating system can include a low voltage, for example 24 VAC, operated gas valve which controls the flow of gas to the furnace, the cooling system includes a contactor having a low-voltage coil and high-voltage contacts which control energizing of the compressor; and the circulation system includes a fan relay having a low-voltage coil and high-voltage contacts which control energizing of the fan which circulates the conditioned air. The electrical power for energizing such low-voltage operated devices is provided either by a single transformer 260 for both heating and cooling, or by two separate transformers 260 for heating and 262 for cooling. Often, a single transformer is provided when the heating and cooling system is installed as a complete unit. If the cooling system is added to an existing heating system, sometimes an additional transformer is used.

Figure 3:
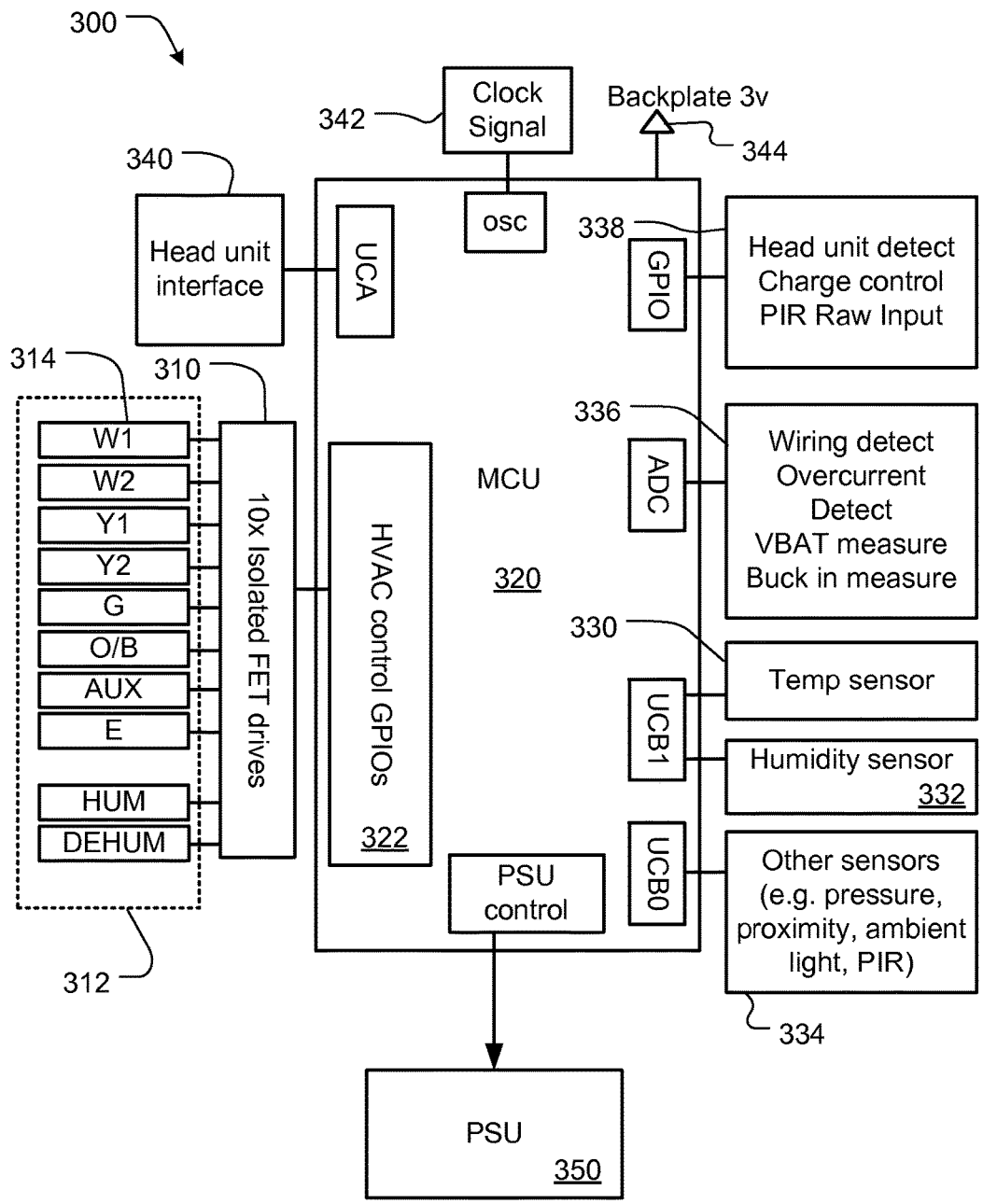
FIG. 3 is a block diagram of some circuitry of a thermostat, according to some embodiments.

FIG. 3 is a block diagram of some circuitry of a thermostat, according to some embodiments. According to some embodiments, the thermostat is made up of two main units: (1) a back plate that includes connector terminals for connection to the HVAC system wires, power harvesting circuitry, HVAC control circuitry and other components; and (2) a head unit that includes a user interface, additional sensors, wireless communication and other components. Circuitry 300, according to some embodiments, is some of the circuitry included in the back plate of the thermostat. Note that other circuitry may be included in the back plate that is not shown. For example, the back plate can include wireless communication capability, according to some embodiments. A number of HVAC wires can be attached using HVAC terminals 312. One example of which is the W1 terminal 314. Each terminal is used to control an HVAC function. According to some embodiments, each of the wires from the terminals W1, W2, Y1, Y2, G, O/B, AUX and E is connected to a separate isolated FET drive within 310. The common HVAC functions for each of the terminals are: W1 and W2 heating; Y1 and Y2 for cooling; G for fan; O/B for heatpumps; and E for emergency heat. Note that although the circuitry 300 is able control 10 functions using the isolated FET drives 310, according to some embodiments, other functions, or fewer functions can be controlled. For example circuitry for a more simply equipped HVAC system may only have a single heating (W), and single cooling (Y) and a fan (G), in which case there would only be three isolated FET drives 310. According to a preferred embodiment, 5 FET drives 310 are provided, namely heating (W), cooling (Y), fan (G), auxiliary (AUX) and compressor direction (O/B). Further detail of the isolated FET drive circuitry, according to some embodiments is provided in FIG. 4. According to some embodiments, greater or lesser numbers of FET drives 310 can be provided in accordance with the application. For example, humidification and dehumidification can be controlled using one or more additional FET drives. Not shown are the circuit returns such as RH (return for heat) and RC (return for cooling).

The HVAC functions are controlled by the HVAC control general purpose input/outputs (GPIOs) 322 within MCU 320. MCU 320 is a general purpose microcontroller such as the MSP430 16-bit ultra-low power MCU available from Texas Instruments. MCU 320 communicates with the head unit via Head Unit Interface 340. The head unit together with the backplate make up the thermostat. The head unit has user interface capability such that it can display information to a user via an LCD display and receive input from a user via buttons and/or touch screen input devices. According to some embodiments, the head unit has network capabilities for communication to other devices either locally or over the internet. Through such network capability, for example, the thermostat can send information and receive commands and setting from a computer located elsewhere inside or outside of the enclosure. The MCU detects whether the head unit is attached to the backplate via head unit detect 338.

Clock 342 provides a low frequency clock signal to MCU 320, for example 32.768 kHz. According to some embodiments there are two crystal oscillators, one for high frequency such as 16 MHz and one for the lower frequency. Power for MCU 320 is supplied at power input 344 at 3.0 V. Circuitry 336 provides wiring detection, battery measurement, and buck input measurement. A temperature sensor 330 is provided, and according to some embodiments and a humidity sensor 332 are provided. According to some embodiments, one or more other sensors 334 are provided such as: pressure, proximity (e.g. using infrared), ambient light, and pyroelectric infrared (PIR). Power circuitry 350 is provided to supply power.

Figure 4:
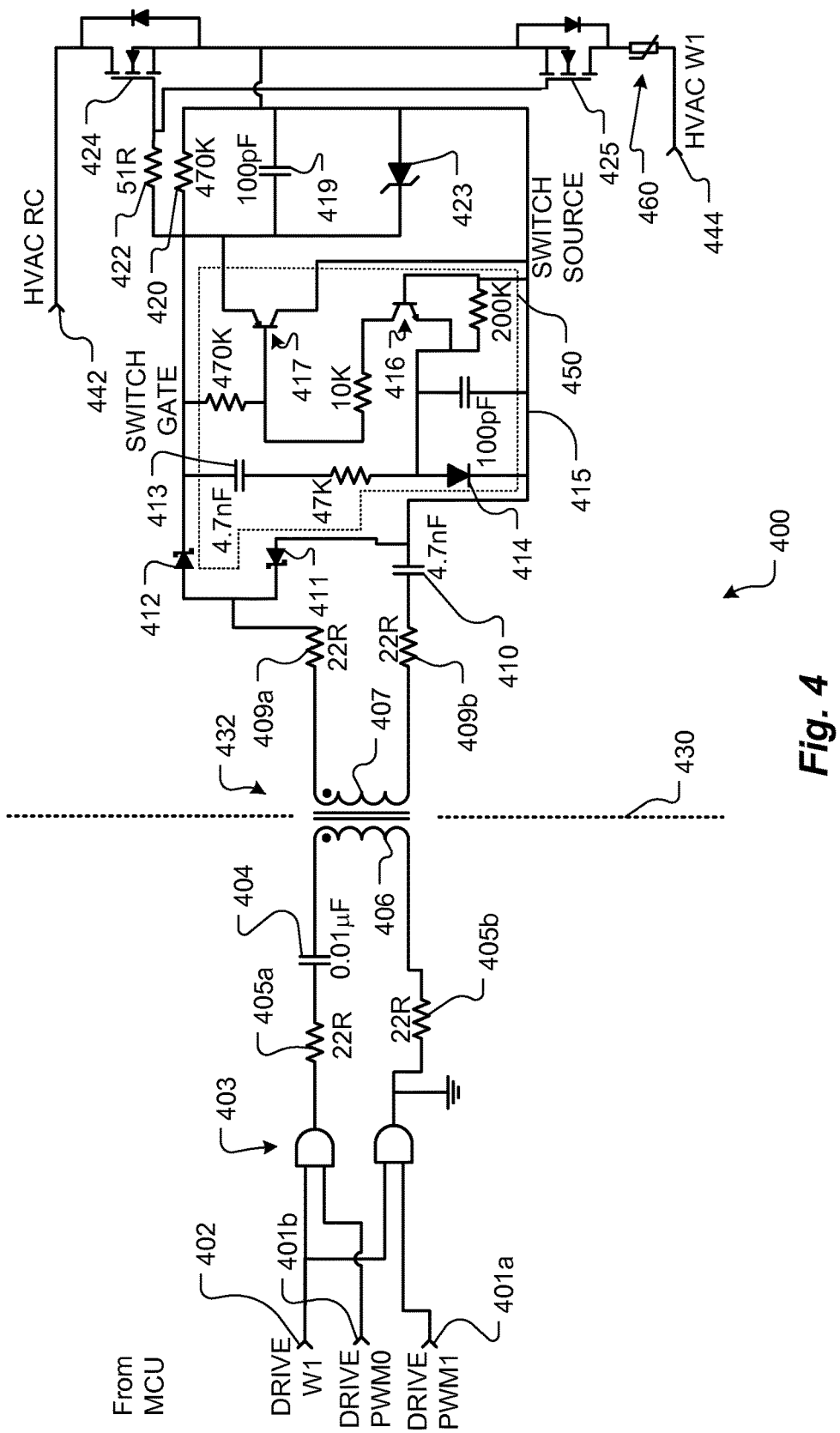
FIG. 4 is a schematic of solid-state electronic AC switch with a transformer isolated control input, according to some embodiments.

FIG. 4 is a schematic of solid-state electronic AC switch with a transformer isolated control input, according to some embodiments. Sub-circuit 400 controls a bidirectional power switch, which is an AC switch between terminals 442 and 444, by sending a control signal across an isolation barrier 430 as a high frequency AC signal. The control signal is rectified and filtered and applied to the gates of two N-channel MOSFETs 424 and 425. The switch is on when the DC gate to source voltage of the MOSFETs 424 and 425 is above the threshold voltage of the MOSFETs. Both MOSFETs 424 and 425 see essentially the same gate to source voltage. Additional circuitry is added to turn the switch off quickly shortly after the control signal is stopped.

Inputs 401a and 401b are a logic level clock signal from the MCU, and are preferably differential signals. Inputs 401a and 401b generate the frequency that is coupled across the isolation component. According to some embodiments, inputs 401a and 401b are not a fixed frequency, but rather a spread spectrum. Input 402 enables the AND gates 403. AND gates 403 are AND logic gates that generate a buffered AC signal for driving the transformer 432. An example of a suitable logic component for AND gates 403 is a dual buffer/driver such as the SN74LVC2G08 from Texas Instruments.

AC coupling capacitor 404, this component prevents DC current from flowing in the transformer, which would reduce efficiency and could hurt operation due to transformer saturation. Resistors 405a and 405b work in conjunction with stray capacitances to round the sharp edges of the clock signals, limit instantaneous currents, and damp resonant circuits. This reduces EMI.

It should be noted that other topologies of driver circuits could be used for 401-405 above, according to other embodiments. The embodiment shown in FIG. 4 has been found to reduce drive power requirements to a very low level.

Transformer 432 includes primary winding 406 and secondary winding 407. The transformer 432 provides isolation, such that the switch could be many volts different potential from the control circuitry. According to some embodiments, transformer 432 is an Ethernet transformer. Ethernet transformers have been found to work well with a very low cost. According to the other embodiments, other styles of transformers could be used. According to some embodiments, coupled inductors such as LPD3015 series from Coilcraft are used. According to some embodiments, the transformer 432 is replaced with capacitors, as this is an alternative way to get AC energy across a boundary 430.

The transformer 432 has a turns ratio of 1:1 primary winding 406 to secondary winding 407, although other windings ratios can be used according to other embodiments. With ±3 volts across the primary of the transformer, a 1:1 ratio transformer generates about +6 volts of gate to source voltage on the FETs 424 and 425. The topology shown is a modified push pull. According to other embodiments, other topologies including forward, flyback, and push pull could be used. Resistors 409a and 409b work in conjunction with stray capacitances to round the sharp edges of the clock signals, limit instantaneous currents, and damp resonant circuits. This reduces EMI.

AC coupling capacitor 410 accumulates a DC voltage across it in normal operation which is approximately the output gate to source voltage divided by 2. This capacitor 410 allows the transformer 432 to be used more effectively than if it was not there. If the output voltage is half what it should be, this capacitor 410 is likely shorted.

Bottom diode 411 is on for half the cycle, and enables the capacitor 410 to charge to half the output voltage. Top diode 412 is on for the other half of the cycle, and basically peak detects the voltage on the capacitor 410 with the voltage across the transformer, resulting in a rectified output voltage across capacitor 419.

Circuit 450 is used to enable a fast turn off characteristic. When the voltage on the Switch Gate is rising with respect to the Switch Source, capacitor 413 charges up through diode 414. When the voltage on the Switch Gate drops with respect to the Switch Source, this capacitor 413 pulls down on the emitter of NPN 416 which turns on 416, which turns on 417, which discharges 419 (as well as the capacitances of the MOSFETs 424 and 425) and quickly turns off the switch. This fast turn off characteristic may be useful in an energy harvesting application such as described in greater detail in co-pending U.S. patent application Ser. No. 13/034,678 entitled "Thermostat Battery Recharging" filed on even date herewith, and which is incorporated herein by reference. Capacitor 415 may be helpful in EMI immunity tests. Resistor 418 prevents PNP 417 from turning on due to leakage currents.

Resistor 420 discharges the gate source capacitance voltage and tends to turn off the switch, and to hold it off when no control signal is present. Gate resistor 422 prevents the FETs 424 and 425 from oscillating due to their follower topology. Zener diode 423 prevents the gate to source voltage from going too high, which could damage the FETs 424 and 425.

FETs 424 and 425 are the main switching elements in the circuit 400. FETs 424 and 425 tend to be on when the gate to source voltage is above the threshold voltage of the FETs, and tend to be off when the gate to source voltage is less than the threshold voltage. As this is a bidirectional AC Switch, two FETs are used because available FETs have a drain to source body diode, and if only one FET were used the switch would be "On" due to the body diode for half of the AC cycle.

Note that the with the circuit of FIG. 4, the left side of barrier 430 is digital logic controlled by the MCU and is ground referenced, while the right side of barrier 430 is a floating solid state (using FETs) switch that is does not reference ground. The floating no-ground reference nature of the FET drive advantageously enables connection to two-transformer systems with shorted (preferably with a fuse) Rc and Rh wires. If the isolation was not present, and the right side was ground referenced, when one circuit was "on" and the other was "off" the "on" circuit would take power from the "off" circuit. Thus the design as shown in FIG. 4 allows for solid state switching of the HVAC circuits having either one or two power transformers without the need for removable jumpers during installation.

According to some embodiments, the circuitry 450 provides for the connection between terminals 442 and 444 to be open very quickly when the control signal is received from the driver circuit. According to some embodiments the fast turn-off circuitry 450 is used for isolated FET drives for HVAC wires used for power harvesting, such as W (heating) and Y (cooling), but is omitted from other isolated FET drives that are not used for power harvesting, such as for Aux, G (fan), and O/B (compressor direction).

Additionally, the circuitry shown in FIG. 4 provides for a failsafe "open," in that when there is no control signal being received the state for any reason, the connection between terminals 442 and 444 is in an open state. This is an important advantage over thermostat designs that use bi-stable relays for opening and closing the control circuit. Fast shut off and failsafe open features allow for safe wiring of the thermostat in HVAC system having two power transformers, such as shown in FIG. 6, without the need for a jumper wire to be manually removed.

According to some embodiments, the thermostat carries out current sensing through the HVAC control circuit by detecting the voltage across the FETs 424 and 425. Unlike most thermostats, that use mechanical relays having virtually no measurable voltage drop to open and close the HVAC control circuit for the HVAC function, the thermostat as described herein uses solid state switching which has enough voltage drop so as to allow for current measurements. In the case of FIG. 4, the voltage measurement is made across the FETs 424 and 425 (or terminals 442 and 444). The current measurement made in this fashion, according to some embodiments is used to detect faults such as a common wire plugged in to the wrong terminal (such as a "Y" or "W" terminal). According to some embodiments a positive temperature coefficient thermistor 460 is used to detect current by measuring voltage drop, and in the case of wiring faults the thermistor also acts to limit current.

Figure 5:
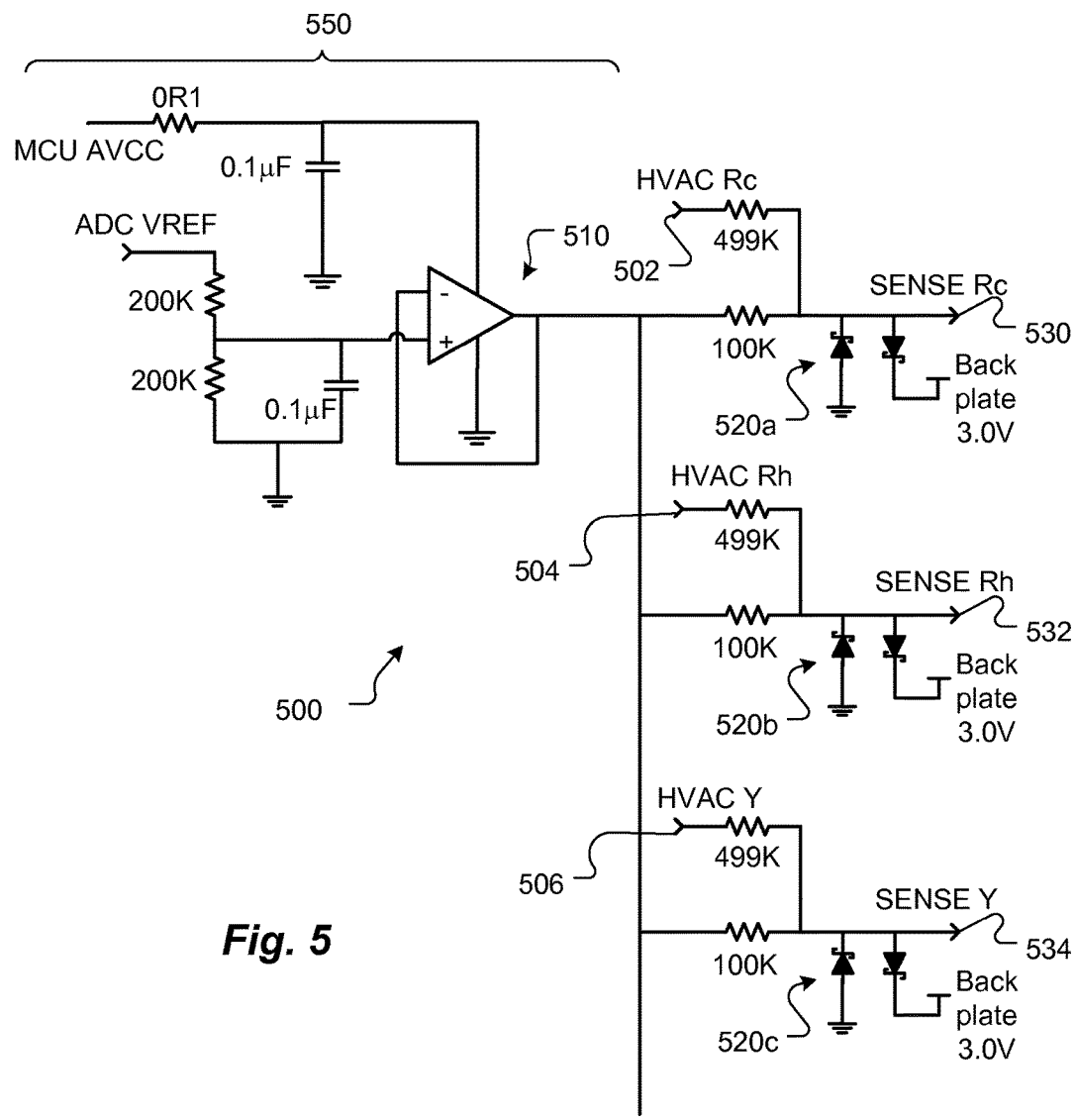
FIG. 5 is a schematic of a half-bridge sense circuit, according to some embodiments.

FIG. 5 is a schematic of a half-bridge sense circuit, according to some embodiments. Circuit 500 provides voltage sensing, clipped to 3.0 volts, for presence detection and current sensing when the switches are closed. At inputs 502, 504 and 506 are the 24 VAC waveforms from three of the HVAC circuits. In the case shown in FIG. 5, inputs 502, 504 and 506 are for HVAC Rc, HVAC Rh and HVAC Y, respectively. The sense input bias buffer 550 is provided as shown. Note that a voltage divider is used in each case that takes the voltage from 24 volts to approximately 4 volts. Clamp diodes 520a, 520b and 520c ensure that the voltage goes no higher or lower than the range of the microcontroller 320 (shown in FIG. 3). The Sense outputs 530, 532 and 534 are connected to the microcontroller 320 so that the microcontroller 320 can sense the presence of a signal on the HVAC lines. The circuits are repeated for the other HVAC lines so that the microcontroller can detect signals on any of the HVAC lines.

Figure 6A:
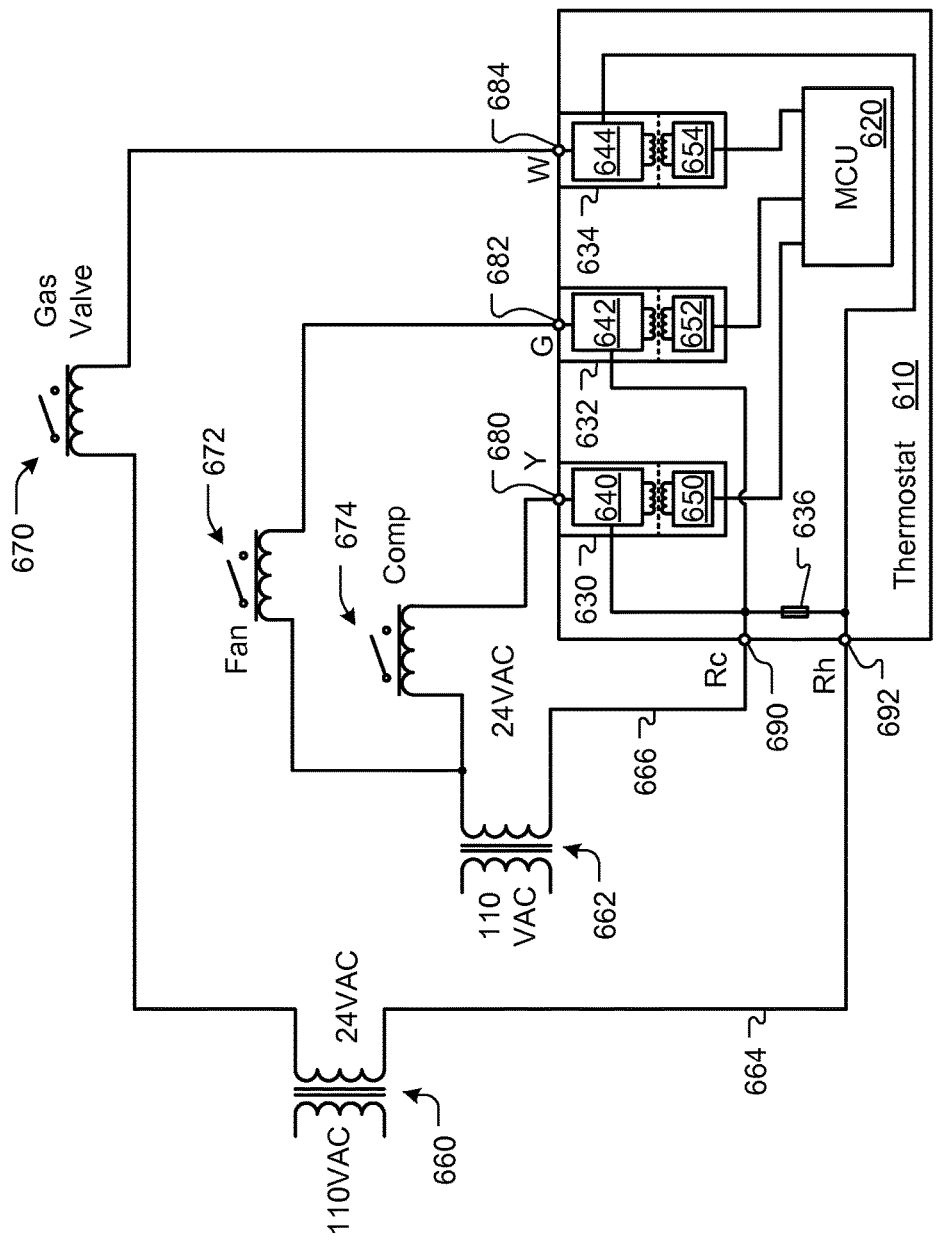
FIGS. 6A-B illustrate a jumperless thermostat connected to two different HVAC systems, according to some embodiments.
Figure 6B:
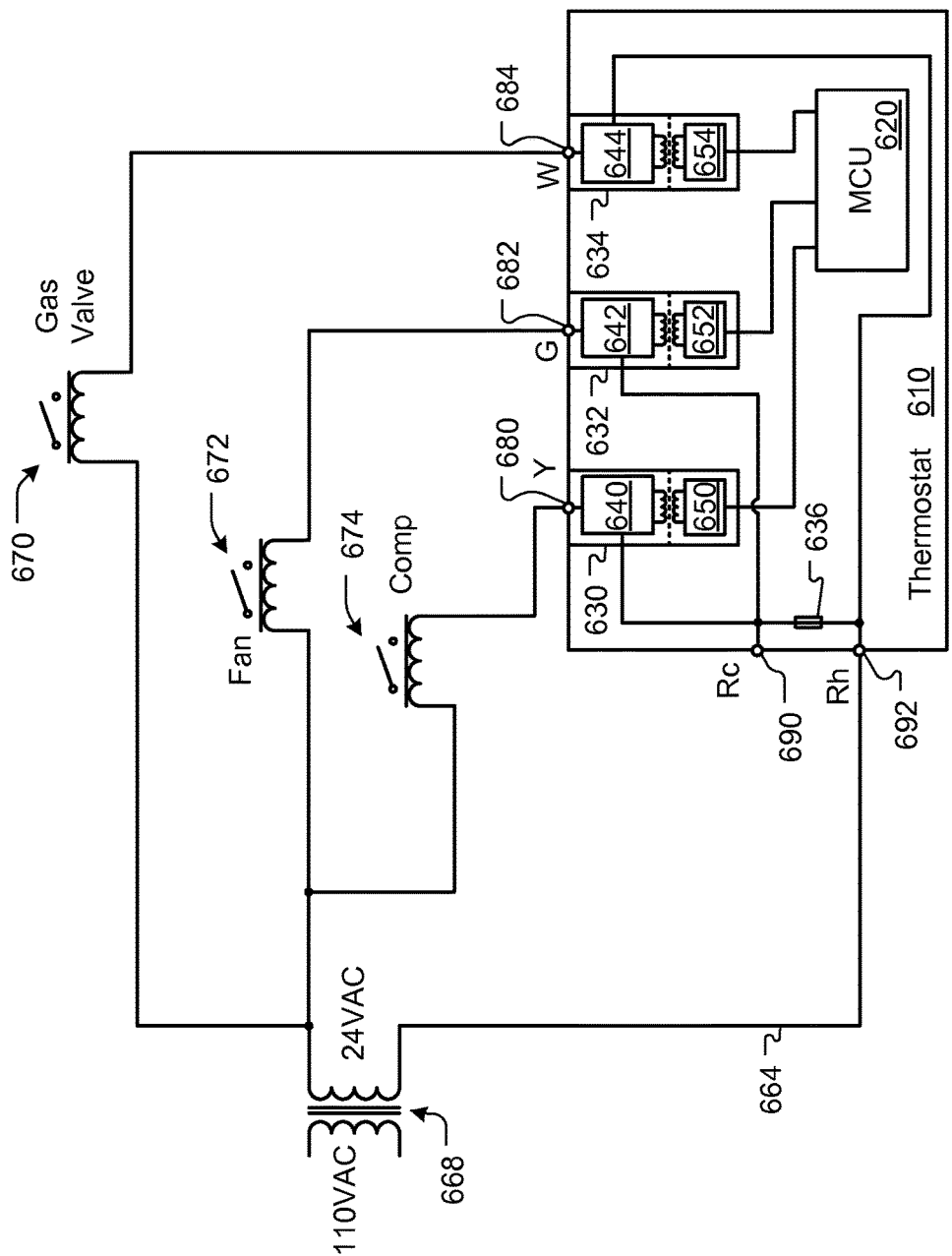

FIGS. 6A-B illustrate a jumperless thermostat connected to two different HVAC systems, according to some embodiments. FIG. 6A shows jumperless thermostat 610 wired for control to an HVAC system having two power transformers 660 and 662. As discussed elsewhere herein, a two-transformer HVAC system is commonly found in residences and light commercial buildings in which an existing heating system was subsequently upgraded or had had an air conditioning system installed. Heat power transformer 660 converts 110 volt AC power to 24 volt AC power for the heating control circuit 664. Similarly, cooling power transformer 662 converts 110 volt AC power to 24 volt AC power for the cooling control circuit 666. Note that the 110 or 24 volt levels could be different, depending on the location of the building and/or what types of power is available. For example, the 110 volts could be 220 or 240 volts in some geographic locations.

Relay 670 controls the gas valve for the HVAC heating system. When sufficient AC current flows through the gas valve relay 670, gas in the heating system is activated. The gas valve relay 670 connected via a wire to terminal 684, which is labeled the "W" terminal, on thermostat 610. Relay 672 controls the fan for the HVAC heating and cooling systems. When sufficient AC current flows through the fan relay 672, the fan is activated. The fan relay 672 connected via a wire to terminal 682, which is labeled the "G" terminal on thermostat 610. Contactor (or relay) 674 controls the compressor for the HVAC cooling system. When sufficient AC current flows through the compressor contactor 674, the fan is activated. The contactor 674 connected via a wire to terminal 680, which is labeled the "Y" terminal, on thermostat 610. The heat power transformer 660 is connected to thermostat 610 via a wire to terminal 692, which is labeled the "Rh" terminal. The cooling power transformer 662 is connected to thermostat 610 via a wire to terminal 690, which is labeled the "Rc" terminal.

Thermostat 610 includes three isolated FET drives 630, 632 and 634 for switching open and close the AC current to each of the relays 670, 672 and 674. Note that according to some embodiments, each of the FET drives 630, 632 and 634 are of the design of sub-circuit 400 as shown and described with respect to FIG. 4, and also correspond to the isolated FET drives 310 in FIG. 3. Although only three isolated FET drives are shown in FIGS. 6A-B, according to some embodiments other numbers of isolated FET drives are provided depending on the number of expected controllable components in the HVAC system where the thermostat is intended to be installed. For example, according to some embodiments, 5 to 10 isolated FET drives can be provided.

Drive 630 includes a switching portion 640 for opening and closing the AC current between terminal 680 and terminal 690, thereby controlling the compressor contactor 674 of the HVAC cooling system. The drive portion 640 is controlled by and isolated from, via a transformer, driver circuit 650. The MCU 620 controls driver circuit 650. Drive 632 includes a switching portion 642 for opening and closing the AC current between terminal 682 and terminal 690, thereby controlling the fan relay 672 of the HVAC heating and cooling systems. The drive portion 642 is controlled and isolated from, via a transformer, driver circuit 652. The MCU 620 controls driver circuit 652. Drive 634 includes a switching portion 644 for opening and closing the AC current between terminal 684 and terminal 692, thereby controlling the gas valve relay 670 of the HVAC system. The drive portion 644 is controlled by and isolated from, via a transformer, driver circuit 654. The MCU 620 controls driver circuit 654. Note that although the drive portions 640, 642 and 644 are isolated from the driver circuits 650, 652 and 654 respectively by a transformer, other isolation means could be provided as described with respect to FIG. 4. Note that due to the design of thermostat 610, the terminals 690 and 692 (i.e. the Rc and Rh terminals) are permanently shorted without the use of a removable jumper. According to some embodiments, a safety fuse 636 is provided.

FIG. 6B shows jumperless thermostat 610 wired for control to an HVAC system having a single power transformer 668 that converts 110 volt AC power to 24 volt AC power for the control circuit 664. In this case, relays 672 and 674, which control the fan and the compressor, respectively, are both attached to transformer 668. The power transformer 668 is connected to thermostat 610 via a wire to terminal 692, which is labeled the "Rh" terminal. Note that since thermostat 610 is designed with a short between terminals 690 and 692, the power transformer 668 could alternatively be connected to thermostat 610 via a wire to terminal 690 (the Rc terminal). Additionally, no jumper needs to be installed or removed by a user or installer when using thermostat 610 with either a one transformer HVAC system as shown in FIG. 6B or a two transformer HVAC system as shown in FIG. 6A. However, in cases where the thermostat is connected to two transformers via terminals 690 and 692, depending on the relative phases of the power circuits, voltages of 48 to 54 VAC can generate voltages as high as about 80 volts within the thermostat, and therefore the components drive portions 640, 642 and 644 should be designed accordingly. For example, according to some embodiments, when thermostat 610 is designed with a short between terminals 690 and 692 as shown in FIGS. 6A and 6B, the exposed components are designed such that up to 100 volts can be tolerated. According to some embodiments, other designs, such as shown in FIGS. 7A-B and 8A-B, can be used to avoid relatively high peak voltages as described.

Figure 7A:
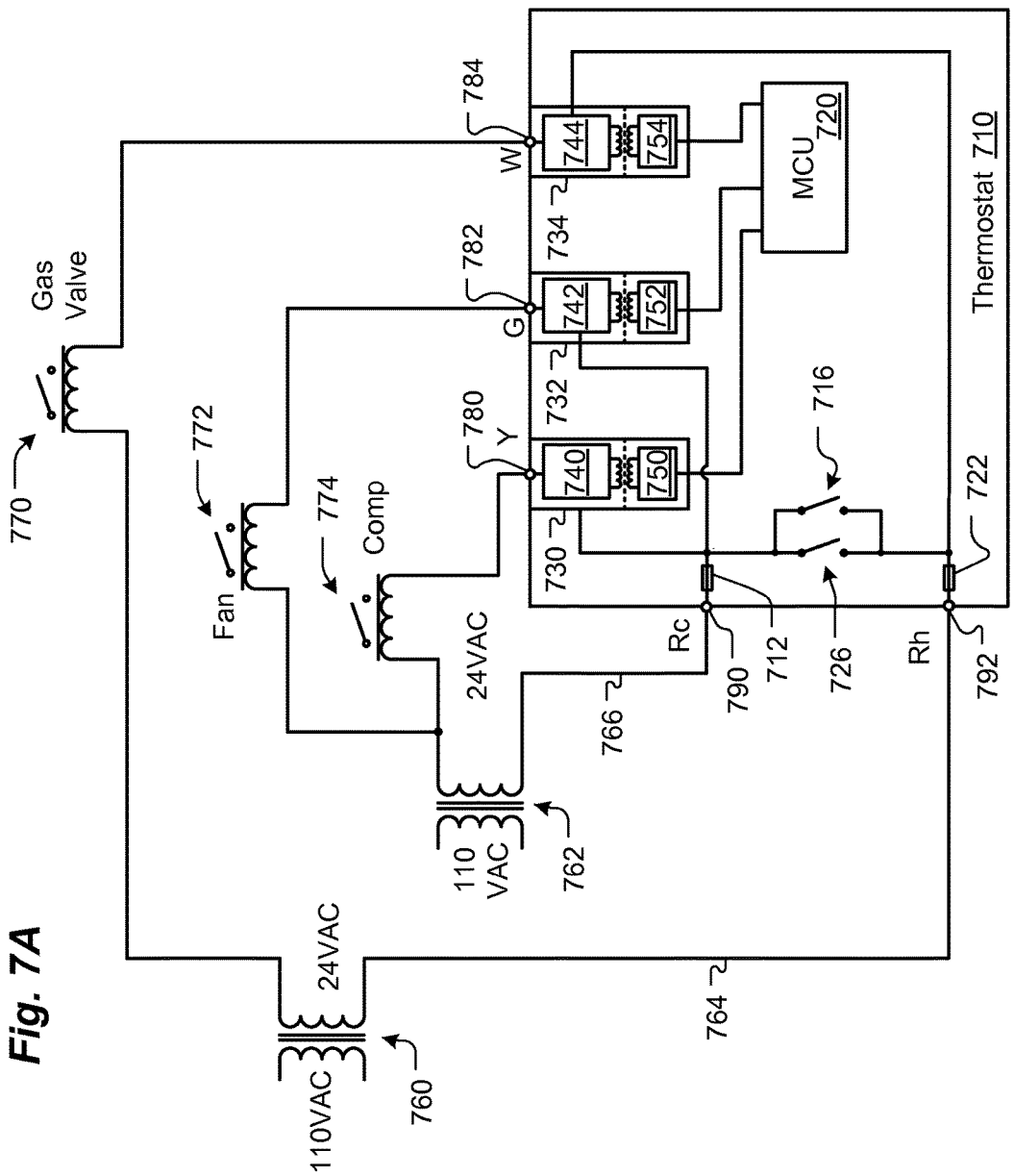
FIGS. 7A-B illustrate a jumperless thermostat connected to two different HVAC systems, according to some embodiments.
Figure 7B:
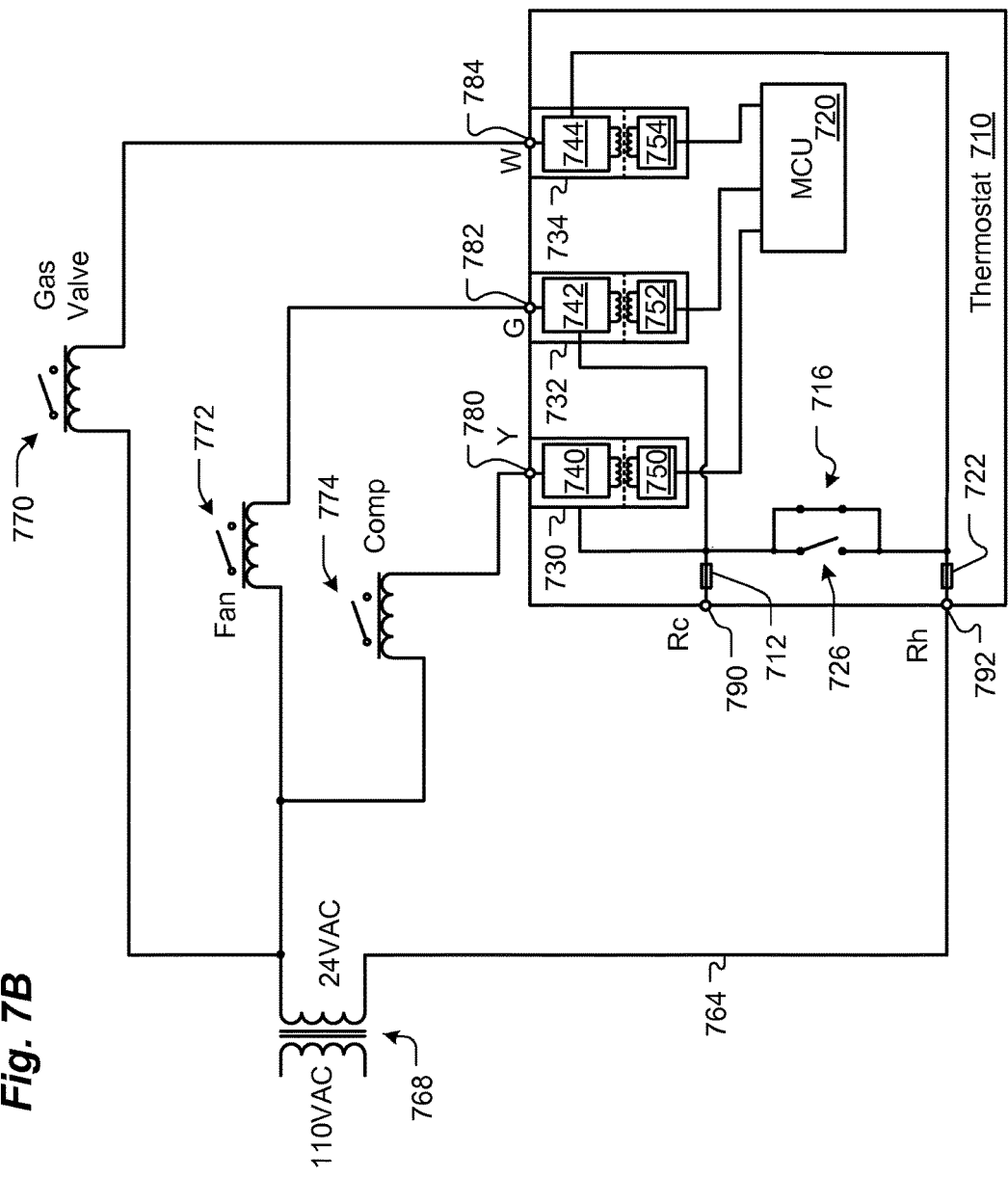

FIGS. 7A-B illustrate a jumperless thermostat connected to two different HVAC systems, according to some embodiments. FIG. 7A shows jumperless thermostat 710 wired for control to an HVAC system having two power transformers 760 and 762. As discussed elsewhere herein, a two-transformer HVAC system is commonly found in residences and light commercial building in which an existing heating system was subsequently upgraded or had had an air conditioning system installed. Heat power transformer 760 converts 110 volt AC power to 24 volt AC power for the heating control circuit 764. Similarly, cooling power transformer 762 converts 110 volt AC power to 24 volt AC power for the cooling control circuit 766. Note that the 110 or 24 volt levels could be different, depending on the location of the building and/or what types of power is available. For example, the 110 volts could be 220 or 240 volts in some geographic locations.

Relay 770 controls the gas valve for the HVAC heating system. When sufficient AC current flows through the gas valve relay 770, gas in the heating system is activated. The gas valve relay 770 connected via a wire to terminal 784, which is labeled the "W" terminal, on thermostat 710. Relay 772 controls the fan for the HVAC heating and cooling systems. When sufficient AC current flows through the fan relay 772, the fan is activated. The fan relay 772 connected via a wire to terminal 782, which is labeled the "G" terminal on thermostat 710. Contactor (or relay) 774 controls the compressor for the HVAC cooling system. When sufficient AC current flows through the compressor contactor 774, the fan is activated. The contactor 774 connected via a wire to terminal 780, which is labeled the "Y" terminal, on thermostat 710. The heat power transformer 760 is connected to thermostat 710 via a wire to terminal 792, which is labeled the "Rh" terminal. The cooling power transformer 762 is connected to thermostat 710 via a wire to terminal 790, which is labeled the "Rc" terminal.

Thermostat 710 includes three isolated FET drives 730, 732 and 734 for switching open and close the AC current to each of the relays 770, 772 and 774. Note that according to some embodiments, each of the FET drives 730, 732 and 734 are of the design of sub-circuit 400 as shown and described with respect to FIG. 4, and also correspond to the isolated FET drives 310 in FIG. 3. Although only three isolated FET drives are shown in FIGS. 7A-B, according to some embodiments other numbers of isolated FET drives are provided depending on the number of expected controllable components in the HVAC system where the thermostat is intended to be installed. For example, according to some embodiments, 5 to 10 isolated FET drives can be provided.

Drive 730 includes a switching portion 740 for opening and closing the AC current between terminal 780 and terminal 790, thereby controlling the compressor contactor 774 of the HVAC cooling system. The switching portion 740 is controlled by and isolated from, via a transformer, driver circuit 750. The MCU 720 controls driver circuit 750. Drive 732 includes a switching portion 742 for opening and closing the AC current between terminal 782 and terminal 790, thereby controlling the fan relay 772 of the HVAC heating and cooling systems. The drive portion 742 is controlled and isolated from, via a transformer, driver circuit 752. The MCU 720 controls driver circuit 752. Drive 734 includes a switching portion 744 for opening and closing the AC current between terminal 784 and terminal 792, thereby controlling the gas valve relay 770 of the HVAC system. The drive portion 744 is controlled by and isolated from, via a transformer, driver circuit 754. The MCU 720 controls driver circuit 754. Note that although the drive portions 740, 742 and 744 are isolated from the driver circuits 750, 752 and 750 respectively by a transformer, other isolation means could be provided as described with respect to FIG. 4.

Two normally-closed switches 716 and 726 are provided between the Rc terminal 790 and the Rh terminal 792. Switch 716 is automatically opened when the presence of a wire connected to the Rc terminal 790 is detected, and switch 726 is opened automatically when the presence of a wire connected to Rh terminal 792 is detected. According to some embodiments, the switches 716 and 726 are provided using a connector as described in co-pending U.S. patent application Ser. No. 13/034,666 entitled "Thermostat Wiring Connector," filed on even date herewith and incorporated herein by reference. In particular, the switches 726 and 716 can correspond to the switched pairs of secondary conductors 750 in FIGS. 7C and 746 in FIG. 7D in that co-pending patent application. Since, in the case shown in FIG. 7A there are wires connected to both Rc and Rh terminals 790 and 792, both switches 716 and 726 are opened and the Rc and Rh terminals 790 and 792 are not electrically connected to each other. Two fuses, 712 and 722 can also be provided for added safety.

FIG. 7B shows jumperless thermostat 710 wired for control to an HVAC system having a single power transformer 768 that converts 110 volt AC power to 24 volt AC power for the control circuit 764. In this case, relays 772 and 774, which control the fan and the compressor, respectively, are both attached to transformer 768. The power transformer 768 is connected to thermostat 710 via a wire to the Rh terminal 792. Since a wire is connected to Rh terminal 792, the switch 726 is open, and since no wire is connected to Rc terminal 790, the switch 716 is closed. Thus an electrical connection exists between the Rc and Rh terminals 790 and 792 as all of the circuitry in thermostat 710 that would be connected to the Rc terminal, such as drives 730 and 732 are connected to the Rh terminal. Note that a similar configuration would result if the user attaches the wire 764 into the Rc terminal 790 instead of the Rh terminal 792. In that case, switch 716 could be closed, but switch 726 would be open.

Figure 8A:
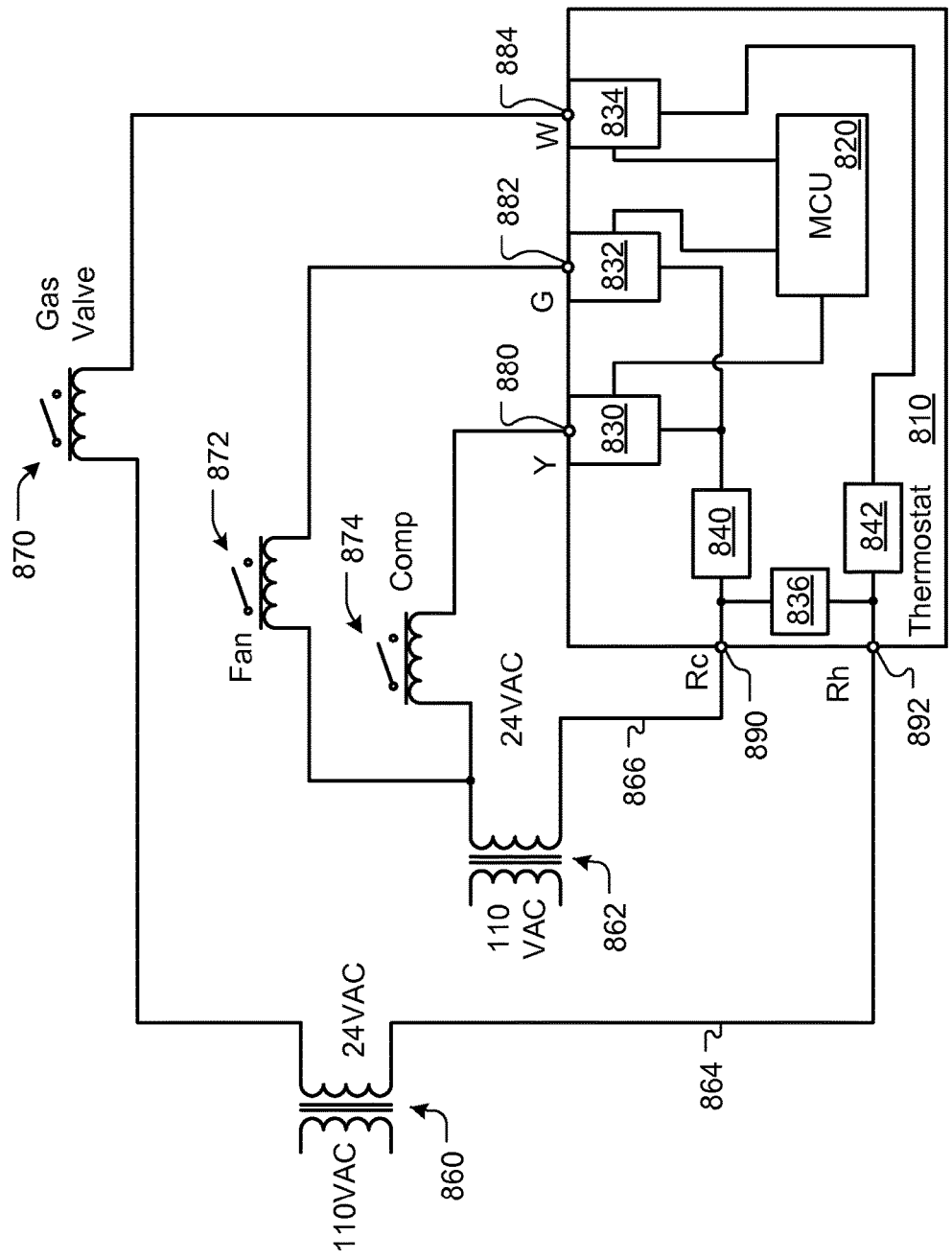
FIGS. 8A-B illustrate a jumperless thermostat connected to two different HVAC systems, according to some alternate embodiments.
Figure 8B:
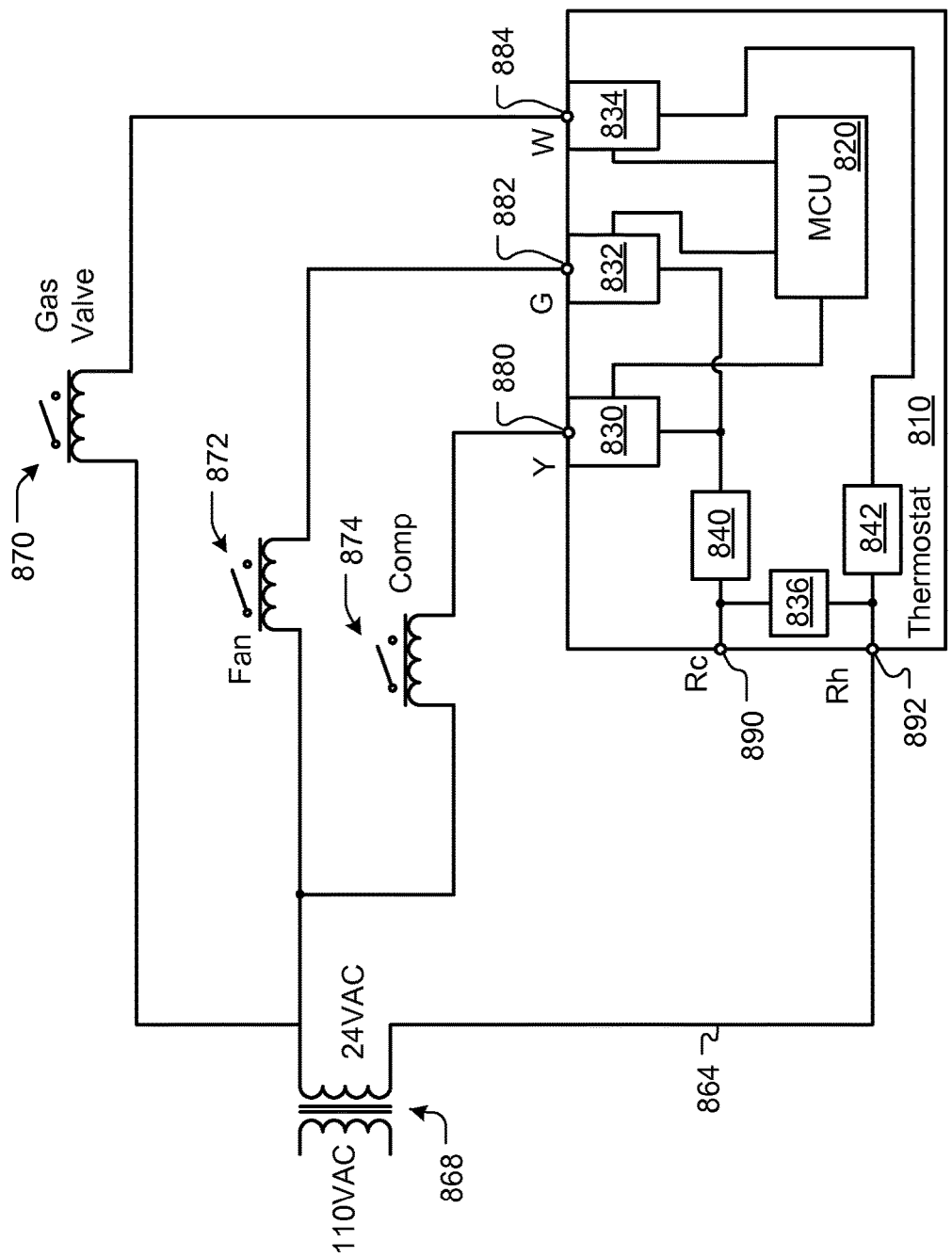

FIGS. 8A-B illustrate a jumperless thermostat connected to two different HVAC systems, according to some alternate embodiments. FIG. 8 shows jumperless thermostat 810 wired for control to an HVAC system having two power transformers 860 and 862. As discussed elsewhere herein, a two-transformer HVAC system is commonly found in residences and light commercial building in which an existing heating system was subsequently upgraded or had had an air conditioning system installed. Heat power transformer 860 converts 110 volt AC power to 24 volt AC power for the heating control circuit 864. Similarly, cooling power transformer 862 converts 110 volt AC power to 24 volt AC power for the cooling control circuit 866. Note that the 110 or 24 volt levels could be different, depending on the location of the building and/or what types of power is available. For example, the 110 volts could be 220 or 240 volts in some geographic locations.

Relay 870 controls the gas valve for the HVAC heating system. When sufficient AC current flows through the gas valve relay 870, gas in the heating system is activated. The gas valve relay 870 connected via a wire to terminal 884, which is labeled the "W" terminal, on thermostat 810. Relay 872 controls the fan for the HVAC heating and cooling systems. When sufficient AC current flows through the fan relay 872, the fan is activated. The fan relay 872 connected via a wire to terminal 882, which is labeled the "G" terminal on thermostat 610. Contactor (or relay) 874 controls the compressor for the HVAC cooling system. When sufficient AC current flows through the compressor contactor 874, the fan is activated. The contactor 874 connected via a wire to terminal 880, which is labeled the "Y" terminal, on thermostat 810. The heat power transformer 860 is connected to thermostat 810 via a wire to terminal 892, which is labeled the "Rh" terminal. The cooling power transformer 862 is connected to thermostat 810 via a wire to terminal 890, which is labeled the "Rc" terminal.

Thermostat 810 includes switching circuits 830, 832 and 834 for switching open and close the AC current to each of the relays 870, 872 and 874 under the control o MCU 820. According to some embodiments, the circuits 830, 832 and 834 could be relays. According to other embodiments, switching circuits 830, 832 and 834 could be implemented using isolated FET drives such as shown in FIGS. 6A-B and 7A-B. Although only three switching circuits are shown in FIGS. 8A-B, according to some embodiments other numbers of switching circuits are provided depending on the number of expected controllable components in the HVAC system where the thermostat is intended to be installed. For example, according to some embodiments, 5 to 10 switching circuits can be provided.

According to some embodiments, thermostat 810 includes two auto detection circuits 840 and 842 to detect whether an AC signal is being applied to terminals 890 and 892 respectively. According some embodiments, a half-bridge sense circuit such as shown and described with respect to FIG. 5, is used for each of the auto detection circuits 840 and 842. Also provided is a switching circuit 836 for opening and closing a connection between the terminals 890 and 892 depending on whether the thermostat 810 is installed with an HVAC system having one or two power transformers. Switching circuit 836 can be implemented using a relay, but solid state switching such as using FETs could be used according to some embodiments.

FIG. 8B shows jumperless thermostat 810 wired for control to an HVAC system having a single power transformer 868. In this case, relays 872 and 874, which control the fan and the compressor, respectively, are both attached to transformer 868. The power transformer 868 is connected to thermostat 810 via a wire to terminal 892, which is labeled the "Rh" terminal. Auto detection using 840 and 842 is carried out while the switching circuit 836 is open. If AC signals are detected on both terminals 890 and 892, then it is assumed that there are two separate HVAC power transformers, such as shown in FIG. 8A. Accordingly the switching circuit 836 is left open. If AC signals are detected on only one of the terminals 890 and 892, then it is assumed that there is only a single HVAC power transformer such as shown in FIG. 8B. Accordingly the switching circuit 836 is closed. Additionally, no jumper needs to be manually installed or removed when using thermostat 810 with either a one transformer HVAC system as shown in FIG. 8B or a two transformer HVAC system as shown in FIG. 8A. By providing an auto-detection capability, the thermostat 810 advantageously does not need to query so as to be easier to install and avoids problems associated with user errors.

According to some embodiments, user input is used to control switching circuit 836 instead of, or in addition to using auto detection circuits 840 and 842. According to such embodiments, user input is provided via a user interface such as button on the head unit of thermostat 810 (not shown), and in response, the MCU 820 opens or closes the switching circuit 836. For example, during installation, a user or installer may be queried whether the HVAC system has one or two power transformers. If the user indicates there are two HVAC power transformers than the switching circuit 836 is opened and if the user indicates there is only one HVAC power transformer then switching circuit 836 is closed.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A thermostat for controlling a heating, ventilation, and air conditioning (HVAC) system, the HVAC system having one or two HVAC transformers, one or more control wires for controlling one or more HVAC functions, and one or two power return wires, each of which is electrically connected to one of the one or two HVAC transformers, the thermostat comprising:
    two power return wiring terminals for making electrical connections to the one or two power return wires;
    a switching circuit for:
        maintaining an electrical connection between the two power return wiring terminals in cases without an external jumper between the two power return wiring terminals and where the HVAC system has only one HVAC transformer; and
        maintaining an electrical isolation between the two power return wiring terminals in cases where the HVAC system has two HVAC transformers;
    one or more solid state switching components adapted and arranged to turn on and off the one or more HVAC functions;
    a processor adapted and configured to send DC signals for turning on and off the one or more HVAC functions using the one or more solid state switching components; and
    one or more isolators positioned and adapted to electrically isolate the processor from the one or more solid state switching components, wherein:
        said one or more solid state switching components comprises, for each said one or more HVAC functions, a FET switch;
        said one or more isolators comprise, for each said one or more HVAC functions, a thermostat transformer; and
        for each said one or more HVAC function, said thermostat comprises:
            driver circuitry coupled between said processor and said thermostat transformer, said driver circuitry being configured to receive at least one of said DC signals from said processor and to provide an AC version thereof to a primary winding of said thermostat transformer; and rectifier circuitry coupled between a secondary winding of said thermostat transformer and said FET switch.

2. The thermostat according to claim 1 wherein the one or more solid state switching components do not reference an electrical ground.

3. The thermostat according to claim 1 wherein each said FET switch includes a first field effect transistor and a second field effect transistor, said thermostat further comprising a varistor clamp coupled between a drain of said first field effect transistor and a drain of said second field effect transistor.

4. The thermostat according to claim 1 wherein the one or more HVAC functions include heating and cooling.

5. The thermostat according to claim 1 wherein the HVAC system is a residential HVAC system.

6. The thermostat according to claim 1 wherein the HVAC system is a light commercial HVAC system.

7. The thermostat according to claim 1 wherein one of the one or more HVAC functions is cooling, and the HVAC system has a cooling capacity of less than about 5 tons.

8. The thermostat according to claim 1 further comprising circuitry connected to the one or more solid state switching components, the circuitry and the solid state switching components adapted and arranged such that the switching is left in an open state in the event of a failure condition within the thermostat.

9. The thermostat according to claim 1 further comprising current sensing circuitry adapted and arranged to sense current passing through the one or more solid state switching components.

10. The thermostat according to claim 9 wherein the current sensing circuitry includes circuitry to measure a voltage differential across at least one of the one or more solid state switching components.

11. The thermostat according to claim 9 wherein the current sensing circuitry includes measuring a voltage differential across a thermistor in series with at least one of the one or more solid state switching components.

12. The thermostat according to claim 1 wherein said driver circuitry includes an AC coupling capacitor coupled to said primary winding of said thermostat transformer for preventing DC current from flowing into said thermostat transformer.

13. The thermostat according to claim 1 wherein the switching circuit includes one or more switches adapted to automatically electrically disconnect the two power return wiring terminals in cases where two power return wires are connected to the two power return wiring terminals.

14. The thermostat according to claim 13 wherein at least one of the one or more switches is mechanically actuated when a connection of a wire is made to one of the two power return wiring terminals.

15. The thermostat according to claim 1 further comprising one or more detection circuits adapted and arranged to detect whether the HVAC system has one or two HVAC transformers.

16. The thermostat according to claim 1 wherein the switching circuit electrically connects or disconnects the two power return wiring terminals based at least in part on input from a user interface.

17. The thermostat according to claim 1 wherein the switching circuit includes a relay.

18. The thermostat according to claim 1 wherein the switching circuit includes second one or more solid state switching components.

* * * * *